US012563494B2

(12) United States Patent
Yang et al.

(10) Patent No.: US 12,563,494 B2
(45) Date of Patent: Feb. 24, 2026

(54) SIGNAL PROCESSING METHOD AND APPARATUS

(71) Applicant: Datang Mobile Communications Equipment Co., Ltd., Beijing (CN)

(72) Inventors: Meiying Yang, Beijing (CN); Jiaqing Wang, Beijing (CN); Fang-Chen Cheng, Beijing (CN)

(73) Assignee: MOBILE EQUIPMENT CO., LTD., Beijing (CN)

( * ) Notice: Subject to any disclaimer, the term of this patent is extended or adjusted under 35 U.S.C. 154(b) by 385 days.

(21) Appl. No.: 18/250,222

(22) PCT Filed: Oct. 22, 2021

(86) PCT No.: PCT/CN2021/125803
§ 371 (c)(1),
(2) Date: Apr. 24, 2023

(87) PCT Pub. No.: WO2022/083755
PCT Pub. Date: Apr. 28, 2022

(65) Prior Publication Data
US 2023/0388927 A1 Nov. 30, 2023

(30) Foreign Application Priority Data

Oct. 23, 2020 (CN) .......................... 202011150417.8

(51) Int. Cl.
*H04W 52/02* (2009.01)
*H04W 68/02* (2009.01)
*H04W 72/23* (2023.01)

(52) U.S. Cl.
CPC ....... *H04W 52/0225* (2013.01); *H04W 68/02* (2013.01); *H04W 72/23* (2023.01)

(58) Field of Classification Search
CPC . H04W 52/0225; H04W 72/23; H04W 68/02; H04W 52/0216; H04W 52/0229;
(Continued)

(56) References Cited

U.S. PATENT DOCUMENTS

2019/0223160 A1 7/2019 He et al.
2020/0145960 A1 5/2020 Tang
(Continued)

FOREIGN PATENT DOCUMENTS

CN 102448167 A 5/2012
CN 109286966 A 1/2019
(Continued)

OTHER PUBLICATIONS

R2-2008361; Paging Enhancements for UE Power Saving in Nr; 3GPP TSG-RAN WG2 meeting #111; Aug. 2020. (Year: 2020).*
International Search Report and Written Opinion received in the corresponding International Application PCT/CN2021/125803, mailed Jan. 13, 2022.
The office action issued in Chinese corresponding application 202011150417.8, mailed on Dec. 31, 2024.
(Continued)

*Primary Examiner* — Hirdepal Singh
(74) *Attorney, Agent, or Firm* — KILPATRICK TOWNSEND & STOCKTON LLP

(57) ABSTRACT

A signal processing method and a signal processing apparatus are provided in the present application. A network device configures a paging early indication for a terminal device in an idle state, where the paging early indication is used for indicating monitoring of a physical downlink control channel (PDCCH) of at least one paging occasion, and/or monitoring of at least one PDCCH with different paging contents; after the network device sends the paging early indication to the terminal device, the terminal device can accurately indicate physical downlink control channel (PDCCH) monitoring at a paging occasion, which avoids unnecessary false wake-up or non-wake-up caused by a paging occasion conflict, thereby reducing power consumption of the terminal device.

16 Claims, 14 Drawing Sheets

(58) Field of Classification Search
CPC . H04W 68/025; H04W 72/232; H04W 76/20;
H04L 5/0053; H04L 5/0091
USPC ......................................................... 455/458
See application file for complete search history.

(56) References Cited

U.S. PATENT DOCUMENTS

| | | | | |
|---|---|---|---|---|
| 2021/0168759 A1* | 6/2021 | Pan | ........................ | H04W 68/02 |
| 2023/0079204 A1* | 3/2023 | Nader | ................... | H04W 68/02 455/458 |
| 2023/0144750 A1* | 5/2023 | Agiwal | ................. | H04W 48/14 455/422.1 |
| 2023/0146553 A1* | 5/2023 | Liao | ...................... | H04W 68/02 370/329 |
| 2024/0049182 A1* | 2/2024 | Zhou | ................... | H04W 72/232 |
| 2024/0163844 A1* | 5/2024 | Ma | ........................ | H04W 68/02 |

FOREIGN PATENT DOCUMENTS

| | | |
|---|---|---|
| CN | 109429372 A | 3/2019 |
| CN | 110167109 A | 8/2019 |
| CN | 110710285 A | 1/2020 |
| CN | 111148128 A | 5/2020 |
| EP | 3634050 A1 | 4/2020 |
| EP | 3657864 A1 | 5/2020 |
| WO | 2018030933 A1 | 2/2018 |
| WO | 2018174612 A1 | 9/2018 |
| WO | 2019202106 A1 | 10/2019 |
| WO | 2020092095 A1 | 5/2020 |
| WO | 2020135019 A1 | 7/2020 |

OTHER PUBLICATIONS

European Patent Office, Extended European Search Report Issued in Application No. 21882167.6, Mar. 26, 2024, Germany, 17 pages.

MediaTek Inc., "Evaluation methodology and paging enhancements for idle/inactive mode UE power saving", 3GPP TSG RAN WG1 #102-e, e-Meeting, Aug. 17-28, 2020, total 11 pages, R1-2005615.

MediaTek Inc., "Paging Enhancements for UE Power Saving in NR", 3GPP TSG-RAN WG2 Meeting #111 electronic, Online, Aug. 17-28, 2020, total 8 pages, R2-2008361.

3GPP TS 36.300 V16.3.0, 3rd Generation Partnership Project; Technical Specification Group Radio Access Network; Evolved Universal Terrestrial Radio Access (E-UTRA) and Evolved Universal Terrestrial Radio Access Network (E- Utran); Overall description; Stage 2 (Release 16), total 390 pages, Sep. 2020.

3GPP TS 36.304 V16.2.0, 3rd Generation Partnership Project; Technical Specification Group Radio Access Network; Evolved Universal Terrestrial Radio Access (E-UTRA); User Equipment (UE) procedures in idle mode (Release 16), total 64 pages, Sep. 2020.

3GPP TS 36.331 V16.2.1, 3rd Generation Partnership Project; Technical Specification Group Radio Access Network; Evolved Universal Terrestrial Radio Access (E-UTRA); Radio Resource Control (RRC); Protocol specification (Release 16), total 1081 pages, Sep. 2020.

Office Action of Corresponding CN Patent Application No. 202011150417.8 dated May 15, 2025.

Vivo, "Not introduce for first PDCCH monitoring occasion indication for paging", 3GPP TSG-RAN WG2 Meeting #103, R2-1811769, Gothenburg, Sweden, Aug. 20-24, 2018.

* cited by examiner

SIGNAL PROCESSING METHOD AND APPARATUS

CROSS-REFERENCE TO RELATED APPLICATIONS

This application is a National Stage of International Application PCT/CN2021/125803, filed on Oct. 22, 2021, which claims priority to Chinese Patent Application No. 202011150417.8, filed on Oct. 23, 2020 and entitled "SIGNAL PROCESSING METHOD AND APPARATUS", both of which are hereby incorporated by reference herein.

FIELD

The present application relates to the field of communication technologies and, in particular, to a signal processing method and a signal processing apparatus.

BACKGROUND

In a new radio (NR) release (release 16, R16), each paging occasion (PO) contains monitoring occasions (MOs).

In a possible manner, in a case where a position of a starting MO is not configured by a PO parameter, a base station starts from configuring a first valid MO of a paging frame (PF) as a first PO, and performs sequential numbering. In a case where the position of the starting MO is configured by the PO parameter, when POs are configured as continuous or discontinuous, the base station starts from configuring a first MO of a PF as a first PO, and performs sequential numbering.

However, no matter whether a parameter of an MO of a first PDCCH of a PO is configured or not, a case where different POs are configured within one slot may occur, and further, a conflict problem caused by paging occasion indications within one slot may occur.

SUMMARY

Embodiments of the present application provide a signal processing method and a signal processing apparatus. A network device configures a paging early indication for a terminal device in an idle state, and after the network device sends the paging early indication to the terminal device, the terminal device can accurately indicate physical downlink control channel (PDCCH) monitoring at a paging occasion, which avoids unnecessary false wake-up or non-wake-up caused by a paging occasion conflict, thereby reducing power consumption of the terminal device.

In one embodiment of the present application provides a signal processing method, including:

configuring, by a network device, a paging early indication for a terminal device in an idle state, where the paging early indication is used for indicating monitoring of a physical downlink control channel (PDCCH) of at least one paging occasion, and/or monitoring of at least one PDCCH with different paging contents;

sending, by the network device, the paging early indication to the terminal device.

In one embodiment, the paging early indication is used for indicating at least one of the following: an identifier of a paging frame within a paging cycle, an identifier of a monitoring occasion (MO) of a first paging PDCCH of a first paging occasion included in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, or an identifier indicating whether to monitor a PDCCH; where the paging occasion group includes at least one paging occasion.

In one embodiment, the identifier of the paging frame includes: a unique identifier of the paging frame within the paging cycle, or a serial number of the paging frame within the paging cycle, or an identifier of a time-domain position where the paging frame is located; and/or, the identifier of the monitoring occasion (MO) of the first paging PDCCH of the first paging occasion includes: a unique serial number of the monitoring occasion (MO) in the paging frame, or indication information about a time-domain position where the monitoring occasion (MO) is located; and/or, the identifier of the paging occasion group in the paging frame includes at least one of the following: a unique serial number of the paging occasion group in the paging frame, an identifier of a time-domain position of the paging occasion group, a unique serial number of a monitoring occasion (MO) of a first paging PDCCH in each paging group of the paging occasion group, an identifier of a time-domain position of a first paging occasion of the paging occasion group; and/or, the terminal identifier or the terminal group identifier of the paging occasion in the paging frame includes: a unique serial number of a terminal or a terminal group in the paging frame, or a relative serial number of a terminal or a terminal group in the paging frame; and/or, the identifier indicating the paging occasion includes: a unique serial number in the paging occasion, or an identifier of a time-domain position in the paging occasion, or an identifier of a first monitoring occasion (MO) for paging in the paging occasion; where the identifier of the first monitoring occasion (MO) for paging in the paging occasion includes a unique serial number of the monitoring occasion (MO), or an identifier of a time-domain position of the monitoring occasion (MO); and/or, the identifier indicating the paging frame and the paging occasion in the paging frame includes: a unique serial number of the paging frame within a paging cycle, or an identifier of a time-domain position of the paging frame.

In one embodiment, the paging early indication is downlink control information (DCI), and a bit field of the DCI at least identifies one of the following: indication information about whether to monitor a paging PDCCH of a terminal or a terminal group under different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the paging early indication is downlink control information (DCI), and a bit field of the DCI at least identifies one of the following: indication information about whether to monitor a paging PDCCH of a terminal or a terminal group under different MOs of different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the bit field of the DCI is further used for identifying an identifier of a paging frame (PF); or an identifier of a paging frame (PF) is preconfigured; or a PO identifier and a paging indication are indicated in the DCI; where quantities of bits corresponding to different POs are different.

In one embodiment, the paging early indication is a sequence, and the sequence is associated with a PF identifier, a PO identifier, an MO identifier.

In one embodiment, an initial sequence of the sequence meets any one of the following:

the initial sequence=F(a PF frame identifier, a PO identifier); or, the initial sequence=F(a PF frame identifier, an identifier of a starting slot of a PO, an identifier of a starting symbol of the PO); or, the initial sequence=F(a PF frame identifier, a starting serial number of a PO); or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO); where F denotes a function operation relationship.

In one embodiment of the present application provides a signal processing method, including:

receiving, by a terminal device, a paging early indication from a network device, where the terminal device is in an idle state, and the paging early indication is used for indicating monitoring of a physical downlink control channel (PDCCH) of at least one paging occasion, and/or monitoring of at least one PDCCH with different paging contents;

performing, by the terminal device, data processing according to the paging early indication.

In one embodiment, the paging early indication is used for indicating at least one of the following: an identifier of a paging frame within a paging cycle, an identifier of a monitoring occasion (MO) of a first paging PDCCH of a first paging occasion included in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, or an identifier indicating whether to monitor a PDCCH; where the paging occasion group includes at least one paging occasion.

In one embodiment, the identifier of the paging frame includes: a unique identifier of the paging frame within the paging cycle, or a serial number of the paging frame within the paging cycle, or an identifier of a time-domain position where the paging frame is located; and/or, the identifier of the monitoring occasion (MO) of the first paging PDCCH of the first paging occasion includes: a unique serial number of the monitoring occasion (MO) in the paging frame, or indication information about a time-domain position where the monitoring occasion (MO) is located; and/or, the identifier of the paging occasion group includes at least one of the following: a unique serial number of the paging occasion group in the paging frame, an identifier of a time-domain position of the paging occasion group, a unique serial number of a monitoring occasion (MO) of a first paging PDCCH in each paging group of the paging occasion group, and an identifier of a time-domain position of a first paging occasion of the paging occasion group; and/or, the terminal identifier or the terminal group identifier of the paging occasion in the paging frame includes: a unique serial number of a terminal or a terminal group in the paging frame, or a relative serial number of a terminal or a terminal group in the paging frame; and/or, the identifier indicating the paging occasion includes: a unique serial number in the paging occasion, or an identifier of a time-domain position in the paging occasion, or an identifier of a first monitoring occasion (MO) for paging in the paging occasion; where the identifier of the first monitoring occasion (MO) for paging in the paging occasion includes a unique serial number of the monitoring occasion (MO), or an identifier of a time-domain position of the monitoring occasion (MO); and/or, the identifier indicating the paging frame and the paging occasion in the paging frame includes: a unique serial number of the paging frame within a paging cycle, or an identifier of a time-domain position of the paging frame.

In one embodiment, the paging early indication is downlink control information (DCI), and a bit field of the DCI at least identifies one of the following: indication information about whether to monitor a paging PDCCH of a terminal or a terminal group under different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the paging early indication is downlink control information (DCI), and a bit field of the DCI at least identifies one of the following: indication information about whether to monitor a paging PDCCH of a terminal or a terminal group under different MOs of different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the bit field of the DCI is further used for identifying an identifier of a paging frame (PF); or an identifier of a paging frame (PF) is preconfigured; or a PO identifier and a paging indication are indicated in the DCI, where quantities of bits corresponding to different POs are different.

In one embodiment, the paging early indication is a sequence, and the sequence is associated with a PF identifier, a PO identifier, an MO identifier.

In one embodiment, an initial sequence of the sequence meets any one of the following:

the initial sequence=F(a PF frame identifier, a PO identifier); or, the initial sequence=F(a PF frame identifier, an identifier of a starting slot of a PO, an identifier of a starting symbol of the PO); or, the initial sequence=F(a PF frame identifier, a starting serial number of a PO); or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO); where F denotes a function operation relationship.

In one embodiment of the present application provides a signal processing apparatus, including a memory, a transceiver and a processor;

the memory is configured to store a computer program;

the transceiver is configured to receive and send data under control of the processor;

the processor is configured to read the computer program in the memory and perform the following operations:

configuring a paging early indication for a terminal device in an idle state, where the paging early indication is used for indicating monitoring of a physical downlink control channel (PDCCH) of at least one paging occasion, and/or monitoring of at least one PDCCH with different paging contents;

sending the paging early indication to the terminal device.

In one embodiment, the paging early indication is used for indicating at least one of the following: an identifier of a paging frame within a paging cycle, an identifier of a monitoring occasion (MO) of a first paging PDCCH of a first paging occasion included in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, or an identifier indicating whether to monitor a PDCCH; where the paging occasion group includes at least one paging occasion.

In one embodiment, the identifier of the paging frame includes: a unique identifier of the paging frame within the paging cycle, or a serial number of the paging frame within the paging cycle, or an identifier of a time-domain position where the paging frame is located; and/or, the identifier of the monitoring occasion (MO) of the first paging PDCCH of the first paging occasion includes: a unique serial number of the monitoring occasion (MO) in the paging frame, or indication information about a time-domain position where the monitoring occasion (MO) is located; and/or, the identifier of the paging occasion group in the paging frame includes at least one of the following: a unique serial number of the paging occasion group in the paging frame, an identifier of a time-domain position of the paging occasion group, a unique serial number of a monitoring occasion (MO) of a first paging PDCCH in each paging group of the paging occasion group, or an identifier of a time-domain position of a first paging occasion of the paging occasion group; and/or, the terminal identifier or the terminal group identifier of the paging occasion in the paging frame includes: a unique serial number of a terminal or a terminal group in the paging frame, or a relative serial number of a terminal or a terminal group in the paging frame; and/or, the identifier indicating the paging occasion includes: a unique serial number in the paging occasion, or an identifier of a time-domain position in the paging occasion, or an identifier of a first monitoring occasion (MO) for paging in the paging occasion; where the identifier of the first monitoring occasion (MO) for paging in the paging occasion includes a unique serial number of the monitoring occasion (MO), or an identifier of a time-domain position of the monitoring occasion (MO); and/or, the identifier indicating the paging frame and the paging occasion in the paging frame includes: a unique serial number of the paging frame within a paging cycle, or an identifier of a time-domain position of the paging frame.

In one embodiment, the paging early indication is downlink control information (DCI), and a bit field of the DCI at least identifies one of the following: indication information about whether to monitor a paging PDCCH of a terminal or a terminal group under different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the paging early indication is downlink control information (DCI), and a bit field of the DCI at least identifies one of the following: indication information about whether to monitor a paging PDCCH of a terminal or a terminal group under different MOs of different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the bit field of the DCI is further used for identifying an identifier of a paging frame (PF); or an identifier of a paging frame (PF) is preconfigured; or a PO identifier and a paging indication are indicated in the DCI; where quantities of bits corresponding to different POs are different.

In one embodiment, the paging early indication is a sequence, and the sequence is associated with a PF identifier, a PO identifier, an MO identifier.

In one embodiment, an initial sequence of the sequence meets any one of the following:

the initial sequence=F(a PF frame identifier, a PO identifier); or, the initial sequence=F(a PF frame identifier, an identifier of a starting slot of a PO, an identifier of a starting symbol of the PO); or, the initial sequence=F(a PF frame identifier, a starting serial number of a PO); or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO);

where F denotes a function operation relationship.

In one embodiment of the present application provides a signal processing apparatus, including a memory, a transceiver and a processor;

the memory is configured to store a computer program;

the transceiver is configured to receive and send data under control of the processor;

the processor is configured to read the computer program in the memory and perform the following operations:

receiving a paging early indication from a network device, where a terminal device is in an idle state, and the paging early indication is used for indicating monitoring of a physical downlink control channel (PDCCH) of at least one paging occasion, and/or monitoring of at least one PDCCH with different paging contents;

performing data processing according to the paging early indication.

In one embodiment, the paging early indication is used for indicating at least one of the following: an identifier of a paging frame within a paging cycle, an identifier of a monitoring occasion (MO) of a first paging PDCCH of a first paging occasion included in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, an identifier indicating whether to monitor a PDCCH; where the paging occasion group includes at least one paging occasion.

In one embodiment, the identifier of the paging frame includes: a unique identifier of the paging frame within the paging cycle, or a serial number of the paging frame within the paging cycle, or an identifier of a time-domain position where the paging frame is located; and/or, the identifier of the monitoring occasion (MO) of the first paging PDCCH of the first paging occasion includes: a unique serial number of the monitoring occasion (MO) in the paging frame, or indication information about a time-domain position where the monitoring occasion (MO) is located; and/or, the identifier of the paging occasion group includes at least one of the following: a unique serial number of the paging occasion group in the paging frame, an identifier of a time-domain position of the paging occasion group, a unique serial number of a monitoring occasion (MO) of a first paging PDCCH in each paging group of the paging occasion group, or an identifier of a time-domain position of a first paging occasion of the paging occasion group; and/or, the terminal identifier or the terminal group identifier of the paging occasion in the paging frame includes: a unique serial number of a terminal or a terminal group in the paging frame, or a relative serial number of a terminal or a terminal group in the paging frame; and/or, the identifier indicating the paging occasion includes: a unique serial number in the paging occasion, or an identifier of a time-domain position in the paging occasion, or an identifier of a first monitoring occasion (MO) for paging in the paging occasion; where the identifier of the first monitoring occasion (MO) for paging in the paging occasion includes a unique serial number of the monitoring occasion (MO), or an identifier of a time-domain position of the monitoring occasion (MO); and/or, the identifier indicating the paging frame and the paging occasion in the paging frame includes: a unique serial number of the paging frame within a paging cycle, or an identifier of a time-domain position of the paging frame.

In one embodiment, the paging early indication is downlink control information (DCI), and a bit field of the DCI at least identifies one of the following: indication information about whether to monitor a paging PDCCH of a terminal or a terminal group under different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the paging early indication is downlink control information (DCI), and a bit field of the DCI at least identifies one of the following: indication information about whether to monitor a paging PDCCH of a terminal or a terminal group under different MOs of different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the bit field of the DCI is further used for identifying an identifier of a paging frame (PF); or an identifier of a paging frame (PF) is preconfigured; or a PO identifier and a paging indication are indicated in the DCI; where quantities of bits corresponding to different POs are different.

In one embodiment, the paging early indication is a sequence, and the sequence is associated with a PF identifier, a PO identifier, an MO identifier.

In one embodiment, an initial sequence of the sequence meets any one of the following:

the initial sequence=F(a PF frame identifier, a PO identifier); or, the initial sequence=F(a PF frame identifier, an identifier of a starting slot of a PO, an identifier of a starting symbol of the PO); or, the initial sequence=F(a PF frame identifier, a starting serial number of a PO); or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO); where F denotes a function operation relationship.

In one embodiment of the present application provides a signal processing apparatus, including:

a processing device, configured to configure a paging early indication for a terminal device in an idle state, where the paging early indication is used for indicating monitoring of a physical downlink control channel (PDCCH) of at least one paging occasion, and/or monitoring of at least one PDCCH with different paging contents;

a sending device, configured to send the paging early indication to the terminal device.

In one embodiment, the paging early indication is used for indicating at least one of the following: an identifier of a paging frame within a paging cycle, an identifier of a monitoring occasion (MO) of a first paging PDCCH of a first paging occasion included in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, an identifier indicating whether to monitor a PDCCH; where the paging occasion group includes at least one paging occasion.

In one embodiment, the identifier of the paging frame includes: a unique identifier of the paging frame within the paging cycle, or a serial number of the paging frame within the paging cycle, or an identifier of a time-domain position where the paging frame is located; and/or, the identifier of the monitoring occasion (MO) of the first paging PDCCH of the first paging occasion includes: a unique serial number of the monitoring occasion (MO) in the paging frame, or indication information about a time-domain position where the monitoring occasion (MO) is located; and/or, the identifier of the paging occasion group in the paging frame includes at least one of the following: a unique serial number of the paging occasion group in the paging frame, an identifier of a time-domain position of the paging occasion group, a unique serial number of a monitoring occasion (MO) of a first paging PDCCH in each paging group of the paging occasion group, or an identifier of a time-domain position of a first paging occasion of the paging occasion group; and/or, the terminal identifier or the terminal group identifier of the paging occasion in the paging frame includes: a unique serial number of a terminal or a terminal group in the paging frame, or a relative serial number of a terminal or a terminal group in the paging frame; and/or, the identifier indicating the paging occasion includes: a unique serial number in the paging occasion, or an identifier of a time-domain position in the paging occasion, or an identifier of a first monitoring occasion (MO) for paging in the paging occasion; where the identifier of the first monitoring occasion (MO) for paging in the paging occasion includes a unique serial number of the monitoring occasion (MO), or an identifier of a time-domain position of the monitoring occasion (MO); and/or, the identifier indicating the paging frame and the paging occasion in the paging frame includes: a unique serial number of the paging frame within a paging cycle, or an identifier of a time-domain position of the paging frame.

In one embodiment, the paging early indication is downlink control information (DCI), and a bit field of the DCI at least identifies one of the following: indication information about whether to monitor a paging PDCCH of a terminal or a terminal group under different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the paging early indication is downlink control information (DCI), and a bit field of the DCI at least identifies one of the following: indication information about whether to monitor a paging PDCCH of a terminal or a terminal group under different MOs of different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the bit field of the DCI is further used for identifying an identifier of a paging frame (PF); or an identifier of a paging frame (PF) is preconfigured; or a PO identifier and a paging indication are indicated in the DCI; where quantities of bits corresponding to different POs are different.

In one embodiment, the paging early indication is a sequence, and the sequence is associated with a PF identifier, a PO identifier, an MO identifier.

In one embodiment, an initial sequence of the sequence meets any one of the following:

the initial sequence=F(a PF frame identifier, a PO identifier); or, the initial sequence=F(a PF frame identifier, an identifier of a starting slot of a PO, an identifier of a starting symbol of the PO); or, the initial sequence=F(a PF frame identifier, a starting serial number of a PO); or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO); where F denotes a function operation relationship.

In one embodiment of the present application provides a signal processing apparatus, including:

a receiving device, configured to receive a paging early indication from a network device in an idle state, where a terminal device is in an idle state, and the paging early indication is used for indicating monitoring of a physical downlink control channel (PDCCH) of at least one paging occasion, and/or monitoring of at least one PDCCH with different paging contents;

a processing device, configured to perform data processing according to the paging early indication.

In one embodiment, the paging early indication is used for indicating at least one of the following: an identifier of a paging frame within a paging cycle, an identifier of a monitoring occasion (MO) of a first paging PDCCH of a first paging occasion included in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, an identifier indicating whether to monitor a PDCCH; where the paging occasion group includes at least one paging occasion.

In one embodiment, the identifier of the paging frame includes: a unique identifier of the paging frame within the paging cycle, or a serial number of the paging frame within the paging cycle, or an identifier of a time-domain position where the paging frame is located; and/or, the identifier of the monitoring occasion (MO) of the first paging PDCCH of the first paging occasion includes: a unique serial number of the monitoring occasion (MO) in the paging frame, or indication information about a time-domain position where the monitoring occasion (MO) is located; and/or, the identifier of the paging occasion group includes at least one of the following: a unique serial number of the paging occasion group in the paging frame, an identifier of a time-domain position of the paging occasion group, a unique serial number of a monitoring occasion (MO) of a first paging PDCCH in each paging group of the paging occasion group, an identifier of a time-domain position of a first paging occasion of the paging occasion group; and/or, the terminal identifier or the terminal group identifier of the paging occasion in the paging frame includes: a unique serial number of a terminal or a terminal group in the paging frame, or a relative serial number of a terminal or a terminal group in the paging frame; and/or, the identifier indicating the paging occasion includes: a unique serial number in the paging occasion, or an identifier of a time-domain position in the paging occasion, or an identifier of a first monitoring occasion (MO) for paging in the paging occasion; where the identifier of the first monitoring occasion (MO) for paging in the paging occasion includes a unique serial number of the monitoring occasion (MO), or an identifier of a time-domain position of the monitoring occasion (MO); and/or, the identifier indicating the paging frame and the paging occasion in the paging frame includes: a unique serial number of the paging frame within a paging cycle, or an identifier of a time-domain position of the paging frame.

In one embodiment, the paging early indication is downlink control information (DCI), and a bit field of the DCI at least identifies one of the following: indication information about whether to monitor a paging PDCCH of a terminal or a terminal group under different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the paging early indication is downlink control information (DCI), and a bit field of the DCI at least identifies one of the following: indication information about whether to monitor a paging PDCCH of a terminal or a terminal group under different MOs of different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the bit field of the DCI is further used for identifying an identifier of a paging frame (PF); or an identifier of a paging frame (PF) is preconfigured; or a PO identifier and a paging indication are indicated in the DCI; where quantities of bits corresponding to different POs are different.

In one embodiment, the paging early indication is a sequence, and the sequence is associated with a PF identifier, a PO identifier, an MO identifier.

In one embodiment, an initial sequence of the sequence meets any one of the following:

the initial sequence=F(a PF frame identifier, a PO identifier); or, the initial sequence=F(a PF frame identifier, an identifier of a starting slot of a PO, an identifier of a starting symbol of the PO); or, the initial sequence=F(a PF frame identifier, a starting serial number of a PO); or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO); where F denotes a function operation relationship.

In one embodiment of the present application provides a processor-readable storage medium, where the processor-readable storage medium stores a computer program, and the computer program is used for causing a processor to execute the method as described in the embodiments.

In one embodiment of the present application provides a computer program product including instructions, and when the instructions run on a computer, the computer is caused to execute the method in the above embodiments.

In one embodiment of the present application provides a signal processing system, including any of the above network device and any of the above terminal device.

BRIEF DESCRIPTION OF DRAWINGS

To describe embodiments of the present application more clearly, the following briefly introduces accompanying drawings required for describing the embodiments or the prior art. Apparently, the accompanying drawings in the following description show some embodiments of the present application.

DESCRIPTION OF EMBODIMENTS

The term "and/or" in the present application describes an association relationship between associated objects, and represents that there may exist three relationships. For example, A and/or B may represent three cases: A exists separately, A and B exist simultaneously, and B exists separately. The character "/" generally indicates an "or" relationship between the associated objects before and after the character.

The term "a plurality of" in embodiments of the present application refers to two or more, and other quantifiers are similar thereto.

The following clearly and comprehensively describes the embodiments of the present application with reference to the accompanying drawings in the embodiments of the present application. Apparently, the described embodiments are merely a part rather than all of the embodiments of the present application.

The embodiments of the present application may be applicable to various systems, and in particular, to a 5G system. For example, an applicable system may be a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. The various systems all include a terminal device and a network device, and further include a core network part, such as an evolved packet system (EPS), a 5G system (5GS), etc.

In the new radio (NR) release (release 16, R16), based on the description of 38.304, each paging occasion (PO) contains monitoring occasions (MOs), and configuration for paging occasions can be understood as configuration for positions of different POs.

In a possible manner, a network device configures MOs of different POs as continuous counting; or the network device may separately configure starting positions for MOs of different POs, where an offset value of a starting position is configurable.

In a case where a position of a starting MO is not configured by a PO parameter, in a paging frame (PF), the network device starts from configuring a first valid MO of the PF as a first PO, and performs sequential numbering as PO2, PO3, and PO4.

Figure 1:
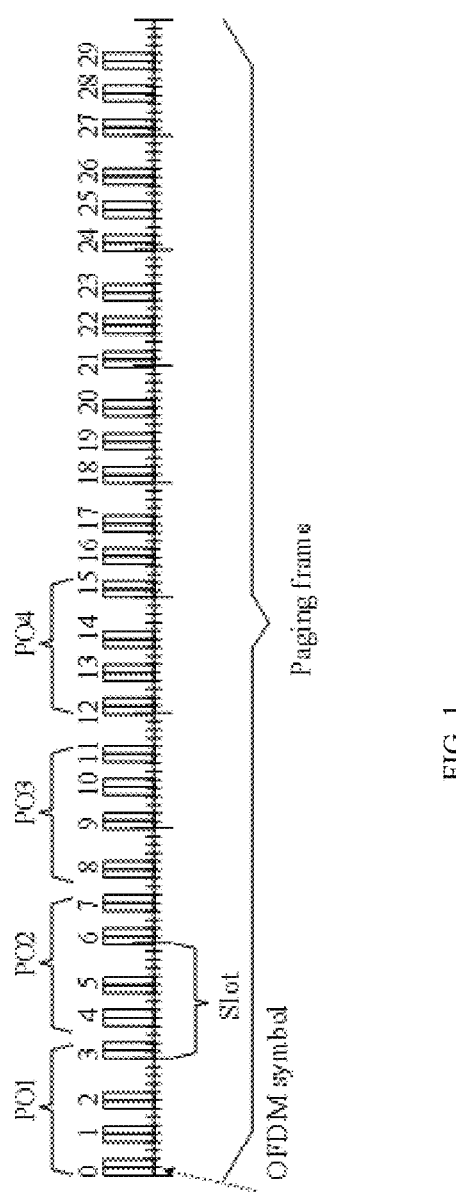
FIG. 1 is a schematic diagram of a paging frame (PF) according to an embodiment of the present application.

Illustratively, FIG. 1 is a schematic diagram of a paging frame (PF) according to an embodiment of the present application. As shown in FIG. 1, a continuous indication manner is used for POs, and a position of a first MO of each PO in the PF is a position of a first valid MO. For example, the position of the first MO of PO1 is 0, the position of the first MO of PO2 is 4, the position of the first MO of PO3 is 8, and the position of the first MO of PO4 is 12.

In a possible manner, an identifier of a PO position may be represented according to the quantity of synchronization signal blocks (SSBs). For example, a serial number of an n-th PO position may be a product of n and the quantity of SSBs corresponding to a PO, where n is a natural number.

In a case where the position of the starting MO is configured by the PO parameter, the POs being continuously configured on continuous orthogonal frequency division multiplexing (OFDM) symbols may occur in the PF, and an OFDM symbol slot may also exist between different POs due to partial parameter configuration.

Figure 2:
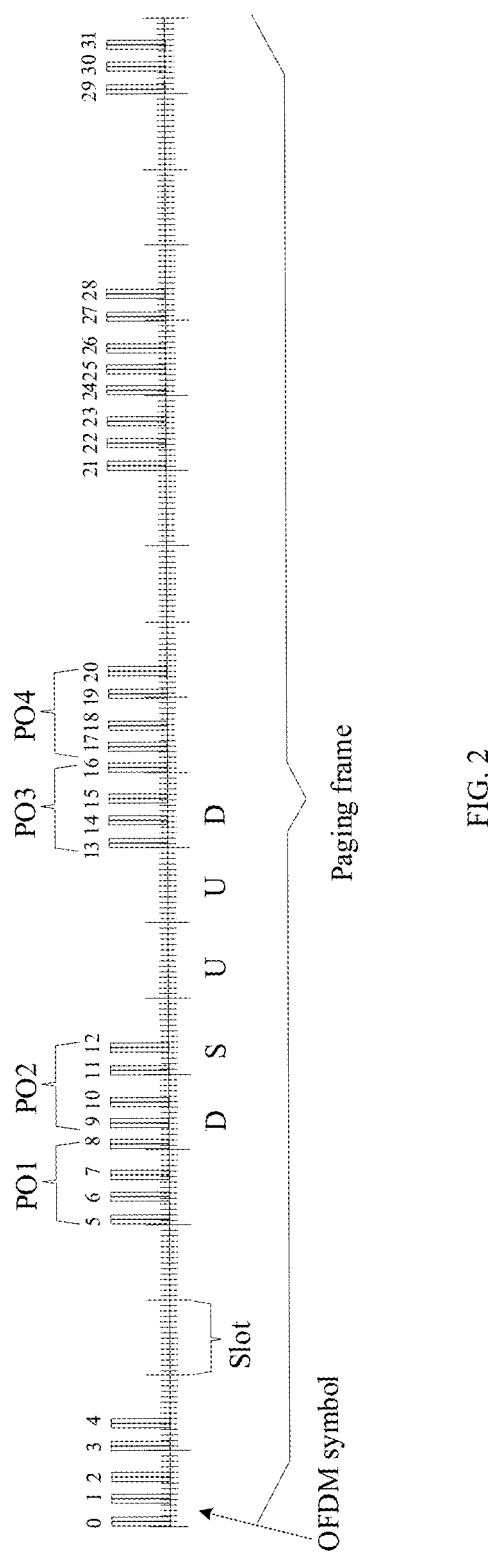
FIG. 2 is a schematic diagram in which paging occasions (POs) are configured as continuous according to an embodiment of the present application.

Illustratively, FIG. 2 is a schematic diagram in which POs are configured as continuous according to an embodiment of the present application. As shown in FIG. 2, a position of a first MO of PO1 is 5, a position of a first MO of PO2 is 9, a position of a first MO of PO3 is 13, and a position of a first MO of PO4 is 17.

Figure 3:
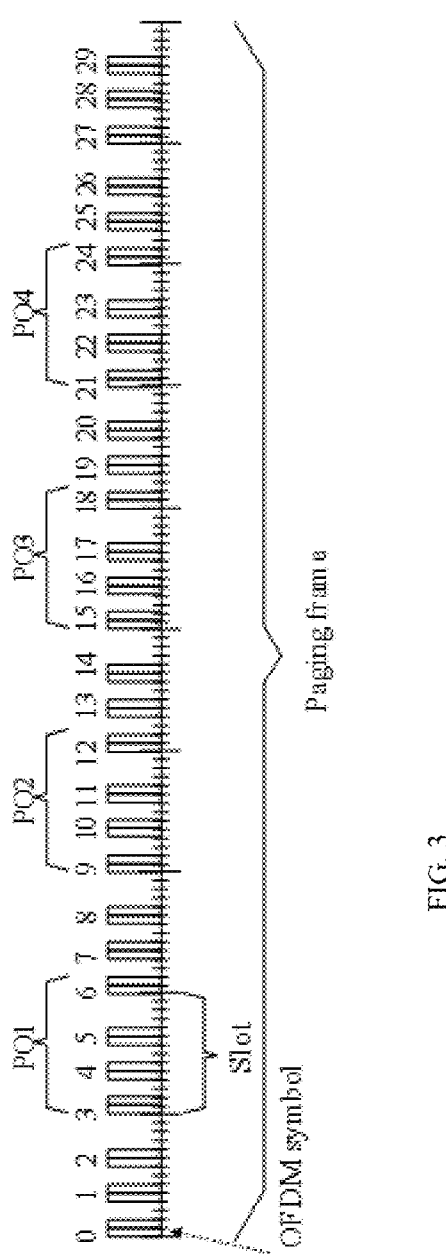
FIG. 3 is a schematic diagram in which POs are configured as discontinuous according to an embodiment of the present application.

Illustratively, FIG. 3 is a schematic diagram in which POs are configured as discontinuous according to an embodiment of the present application. As shown in FIG. 3, a position of a first MO of PO1 is 3, a position of a first MO of PO2 is 9, a position of a first MO of PO3 is 15, and a position of a first MO of PO4 is 21.

In a possible case, a paging early indication (paging early indication, PEI) is configured in the PF to indicate monitoring of an MO of a physical downlink control channel (PDCCH) of a paging signal. In one embodiment, in the NR R16, downlink control information (DCI) format 2-6 may be used for indicating the monitoring of the MO of the PDCCH of the paging signal. DCI format 2-6 indicates monitoring of a PDCCH of a starting position of a DRX cycle after a configuration of a minimum distance being a minimum-gap, and a configuration unit of DCI format 2-6 is also a configuration of milliseconds (ms).

According to another embodiment, in long term evolution (LTE), a narrow band Internet of things (NB-IOT) uses a sequence-based wake-up signal (WUS) to indicate whether it is necessary to wake up to monitor paging within I-DRX. For example, the WUS can respectively indicate a cell identifier (cell-id), a starting sub-frame number of a PO and the number of repetitions of the same PO to determine whether it is necessary to monitor paging. It can be understood that a WUS indication of the NB-IoT may also be a sub-frame.

Figure 4:
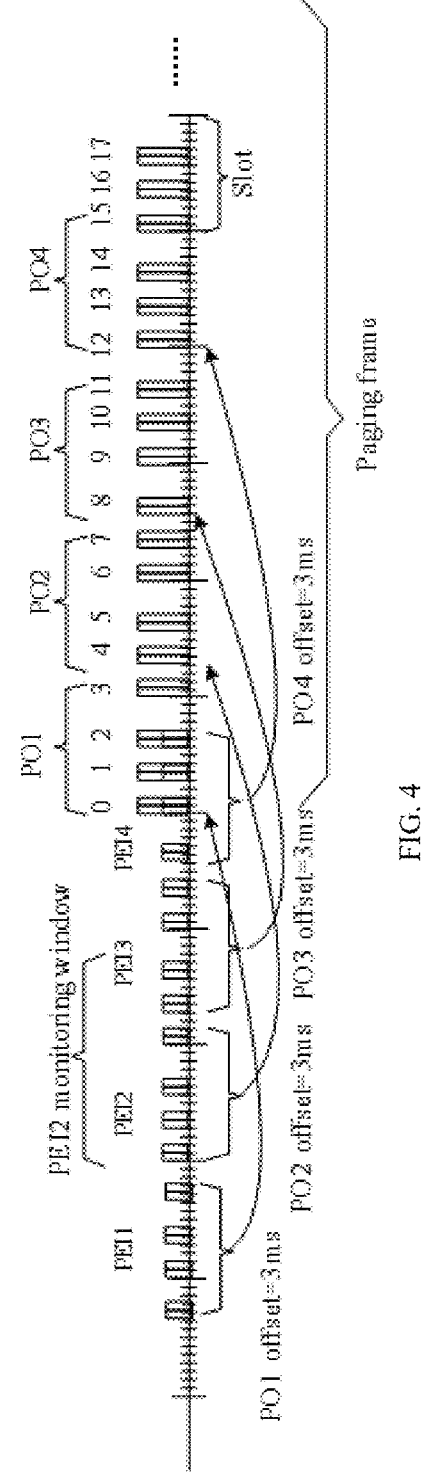
FIG. 4 is a schematic diagram in which paging and paging early indications exist within a paging frame (PF) slot according to an embodiment of the present application.

However, the PEI configured under the NR may have a problem that it cannot distinguish which PO within a slot. Illustratively, FIG. 4 is a schematic diagram in which paging and PEIs exist within a PF slot. As shown in FIG. 4, according to a configured time slot between a PEI and a PO, within a monitoring window of the PEI, there may exist PEI indications of two different POs in a slot.

Based on the above, the embodiments of the present application provide a signal processing method and a signal processing apparatus. A network device configures a paging early indication for a terminal device in an idle state; and after the network device sends the paging early indication to the terminal device, the terminal device can accurately indicate PDCCH monitoring at a paging occasion, to avoid unnecessary false wake-up or non-wake-up caused by a paging occasion conflict, and reducing power consumption of the terminal device.

The embodiments of the present application and how the embodiments of the present application solve the above problem will be described in detail below with reference to specific embodiments. The following specific embodiments may be implemented independently or combined with each other, and the same or similar concept or process may not be repeated in some embodiments.

Figure 5:
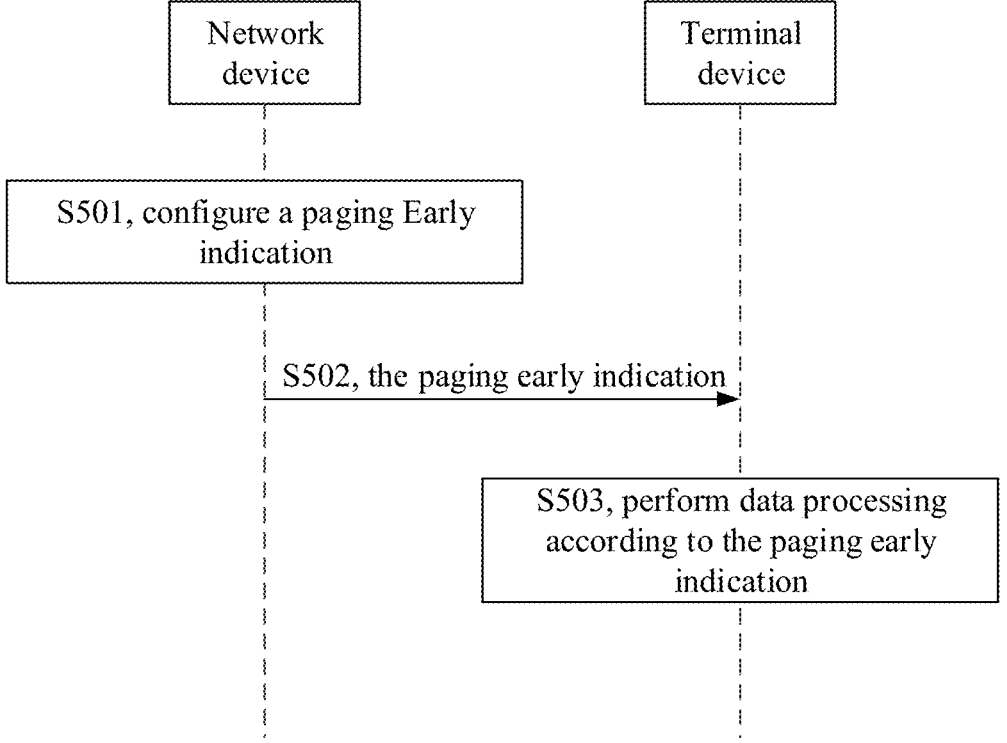
FIG. 5 is a schematic flowchart of a signal processing method according to an embodiment of the present application.

FIG. 5 is a schematic flowchart of a signal processing method according to an embodiment of the present application, including the following steps.

S501: a network device configures a paging early indication.

In the embodiment of the present application, the paging early indication may be a DCI-based indication signal, and may also be a sequence-based indication signal. The paging early indication is used for indicating monitoring of a physical downlink control channel (PDCCH) of at least one paging occasion, and/or monitoring of at least one PDCCH with different paging contents.

For example, the paging early indication may be used for indicating one or more of the following: whether a paging signal exists at a paging occasion, or whether to monitor a PDCCH of the paging signal at the paging occasion, or whether to monitor the paging signal at the paging occasion; or that the paging signal exists at the paging occasion, or to monitor the PDCCH of the paging signal at the paging occasion, or to monitor the paging signal at the paging occasion.

It can be understood that, the paging early indication (PEI) is a manner used by the embodiments of the present application for the convenience of description, and the signal may also be referred to as other nouns. The embodiments of the present application focus on describing the role of the signal, and the name of the signal does not constitute a limitation to the signal itself. A specific implementation format for the network device to configure the paging early indication may also be based on an actual application scenario, which is not limited herein.

S502: the network device sends the paging early indication to the terminal device.

S503: the terminal device performs data processing according to the paging early indication.

The embodiment of the present application does not limit a specific sending manner for the network device to send the paging early indication to the terminal device.

After receiving the paging early indication, the terminal device may receive a paging signal at a corresponding position based on the indication of the paging early indication, to implement conversion from an idle state to a connected state and the like. The embodiment of the present application does not limit a specific embodiment for the terminal device to perform data processing according to the paging early indication.

In conclusion, after configuring the paging early indication, the network device sends the paging early indication to the terminal device, and the terminal device can perform data processing according to the paging early indication, to accurately indicate PDCCH monitoring at a paging occasion, avoiding unnecessary false wake-up or non-wake-up, and reducing power consumption of the terminal device.

It should be noted that, FIG. 5 is a schematic flowchart of interaction between a network device and a terminal device. As seen from the network device side, a signal processing method provided by an embodiment of the present application may include the following steps.

S501: a network device configures a paging early indication.

In the embodiment of the present application, for a manner of configuring the paging early indication by the network device, reference may be made to the description of the foregoing embodiment, and details are not repeated here.

Figure 6:
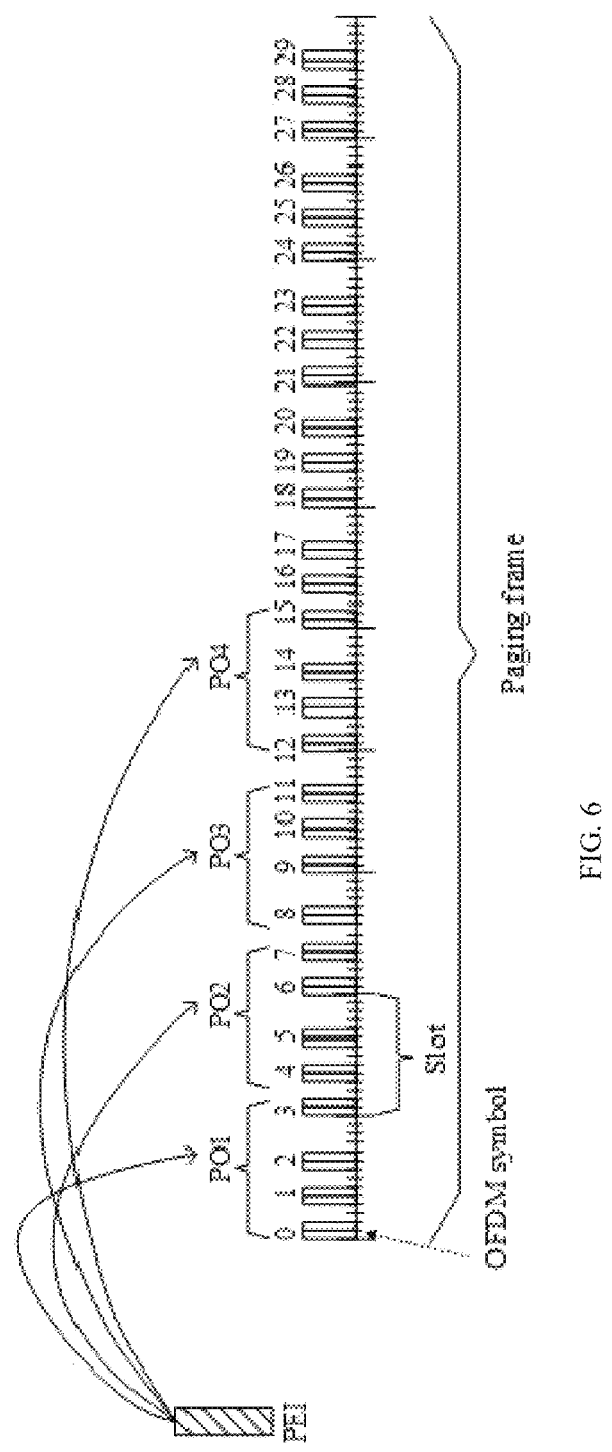
FIG. 6 is a schematic diagram in which a paging early indication indicates paging physical downlink control channel (PDCCH) monitoring of a paging occasion of a PF according to an embodiment of the present application.

In one embodiment, one PEI may indicate paging PDCCH monitoring of paging occasions. Illustratively, FIG. 6 is a schematic diagram in which a PEI indicates paging PDCCH monitoring of a paging occasion of a PF according to an embodiment of the present application. As shown in FIG. 6, one PEI may indicate paging PDCCH monitoring of paging occasions.

In one embodiment, the paging early indication may be used for indicating at least one of the following: an identifier of a paging frame within a paging cycle, an identifier of a monitoring occasion (MO) of a first paging PDCCH of a first paging occasion included in a paging frame, an identifier of a paging occasion group in a paging frame, a terminal identifier or a terminal group identifier of a paging occasion in a paging frame.

Illustratively, the identifier of the paging frame may include one or more of the following: a unique identifier of the paging frame within a paging cycle, a serial number of the paging frame within a paging cycle, or an identifier of a time-domain position where the paging frame is located within a paging cycle. For example, the unique identifier of the paging frame within the paging cycle may be a serial number of the paging frame.

Illustratively, the identifier of the monitoring occasion (MO) of the first paging PDCCH of the first paging occasion included in the paging frame may include a unique serial number of the monitoring occasion (MO) in the paging frame or an indication of a time-domain position where the monitoring occasion (MO) is located. The indication of the time-domain position may include one or more of the following: a time-domain position of a time-domain frame, a time-domain position of a sub-frame in a frame, a time-domain position of a slot in a sub-frame, or a time-domain position of a symbol in a slot.

Illustratively, the identifier of the paging occasion group in the paging frame may include a unique serial number of the paging occasion group in the paging frame, an identifier of a time-domain position of each paging occasion group, a unique serial number of a monitoring occasion (MO) of a first paging PDCCH in each paging group of the paging occasion group in the paging frame, or an identifier of a time-domain position of a first paging occasion of the paging occasion group, where the paging occasion group includes at least one paging occasion.

Illustratively, the terminal identifier or the terminal group identifier of the paging occasion in the paging frame may include a unique serial number of a terminal or a terminal group in the paging frame, a relative serial number of the terminal or the terminal group in the paging frame.

Figure 7:
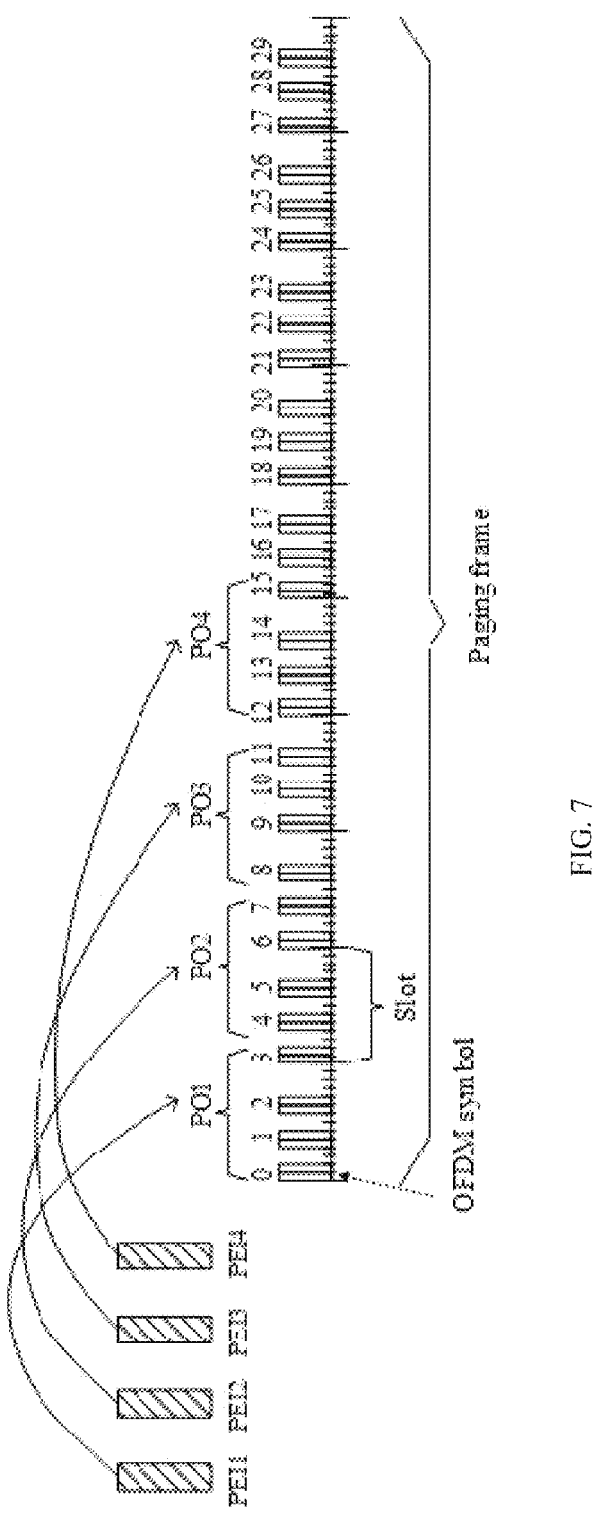
FIG. 7 is a schematic diagram in which a PEI indicates paging PDCCH monitoring of a paging occasion of a PF according to an embodiment of the present application.

In one embodiment, one PEI may indicate paging PDCCH monitoring of one paging occasion. Illustratively, FIG. 7 is a schematic diagram in which a PEI indicates paging PDCCH monitoring of a paging occasion of a PF according to an embodiment of the present application. As shown in FIG. 7, one PEI may indicate paging PDCCH monitoring of one paging occasion.

In one embodiment, illustratively, the paging early indication may be used for indicating at least one of the following: an identifier indicating a paging occasion, an identifier indicating a paging frame and a paging occasion in the paging frame, a sequential number indicating a paging occasion within a paging cycle or an identifier indicating whether to monitor a PDCCH.

Illustratively, the identifier indicating the paging occasion may be a unique serial number in the paging occasion, or may include an identifier of a time-domain position in the paging occasion; and may be an identifier of a unique monitoring occasion (MO) for paging in the paging occasion. The identifier of the unique monitoring occasion (MO) for paging in the paging occasion may be a unique serial number of the monitoring occasion (MO), or may be an indication of a time-domain position of the monitoring occasion (MO), which is used for indicating a relationship between the paging early indication and the paging monitoring occasion (MO) of each paging occasion in the paging frame. The indication of the time-domain position may include at least one of the following: a time-domain position of a time-domain frame, a time-domain position of a sub-frame in a frame, a time-domain position of a slot in a sub-frame or a time-domain position of a symbol in a slot.

Illustratively, the sequential number indicating the paging occasion within the paging cycle may be that, within a DRX cycle, at most 64 POs may be configured by sequential numbers indicating paging occasions within the paging cycle; one PO corresponds to one serial number, and there are at most 64 PO serial numbers; and a PEI indicating a serial number of a PO uniquely distinguishes an identifier of the indicated PO.

Illustratively, the identifier indicating the paging occasion in the PF may include a unique serial number of the PF within a paging cycle or an identifier of a time-domain position of the PF within a paging cycle. The identifier of the paging occasion in the PF is similar to a PF identifier. For example, within a DRX cycle, the network device may configure four PFs, which are numbered as PF1, PF2, PF3, and PF4; each PF may be configured with two POs, which are numbered as PO1 and PO2; and the paging early indication indicates (a PF serial number, a PO serial number).

It should be noted that, the "serial number" may be a serial number specified in a protocol; the "unique serial number" is a noun relative to the "relative serial number"; the "unique serial number" may be used for indicating a one-to-one relationship, and the "relative serial number" does not have one-to-one restriction.

S502: the network device sends the paging early indication to the terminal device.

In conclusion, after configuring the paging early indication, the network device sends the paging early indication to the terminal device, to accurately indicate PDCCH monitoring at a paging occasion, and subsequently, the terminal device can perform data processing according to the paging early indication, to avoid unnecessary false wake-up or non-wake-up, and reducing power consumption of the terminal device.

Figure 8:
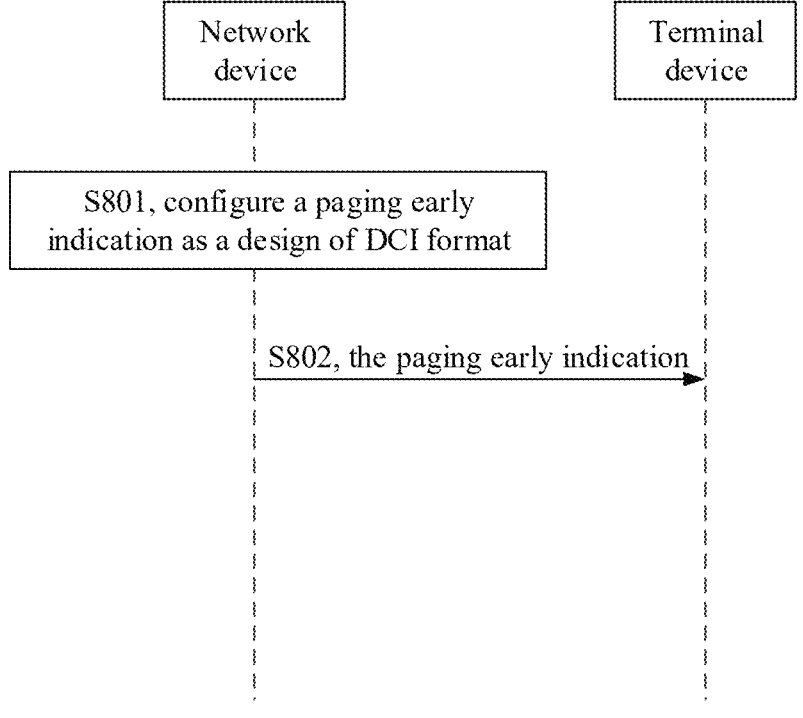
FIG. 8 is a schematic diagram of a signal processing method according to an embodiment of the present application.

In one embodiment, on the basis of the foregoing embodiments, the paging early indication may be designed as a DCI format. Illustratively, FIG. 8 is a schematic diagram of a signal processing method according to an embodiment of the present application, which may include the following steps.

S801: a network device configures a paging early indication as a design of DCI format.

DCI may include bits, and the plurality of bits may also be referred to as a bit field. Each bit may be used for carrying different indication contents of the PEI. For example, any of the above-described contents indicated by the PEI may be carried by using one or more bits in the DCI.

Figure 9:
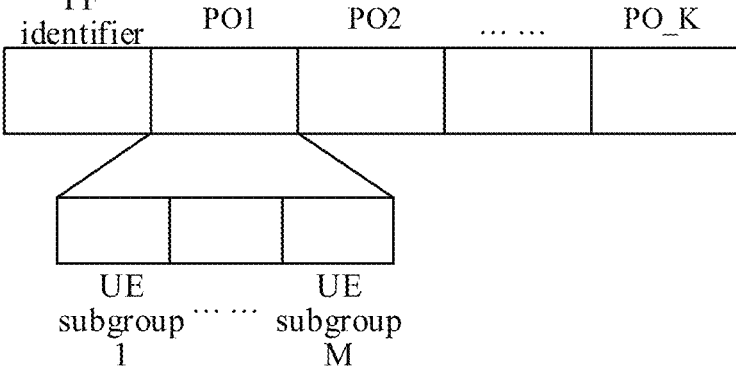
FIG. 9 is a schematic diagram of a downlink control information (DCI) format of a paging early indication according to an embodiment of the present application.

Illustratively, FIG. 9 is a schematic diagram of a DCI format of a PEI according to an embodiment of the present application. As shown in FIG. 9, DCI may include bits, and the plurality of bits may be used for identifying a specific PF identifier and information of one or more POs. For example, FIG. 9 shows POs from PO1 to PO_K.

Bits for identifying the information of the POs may include one or more bits. For example, as shown in FIG. 9, the information for identifying the POs may include bits.

It should be noted that, the quantities of bits corresponding to different POs may be the same or different. For example, since the quantities of UE subgroups corresponding to the POs are different, the quantities of bits used for representing the UE subgroups are also different, where the quantity of bits corresponding to a PO may be the same as the quantity of the UE subgroups corresponding to the PO. For example, as shown in FIG. 9, PO1 may correspond to M UE subgroups, and adaptively, may correspond to M bits.

In the embodiment of the present application, the bits in the DCI can use "0" or "1" to indicate different contents. For example, bit 0 identifies that it is unnecessary to monitor a paging PDCCH at a PO position; bit 1 identifies that it is necessary to monitor the paging PDCCH at the PO position. Or, bit 1 identifies that it is unnecessary to monitor the paging PDCCH at the PO position; bit 0 identifies that it is necessary to monitor the paging PDCCH at the PO position. This is not specifically limited in the embodiment of the present application.

Figures 10, 11:
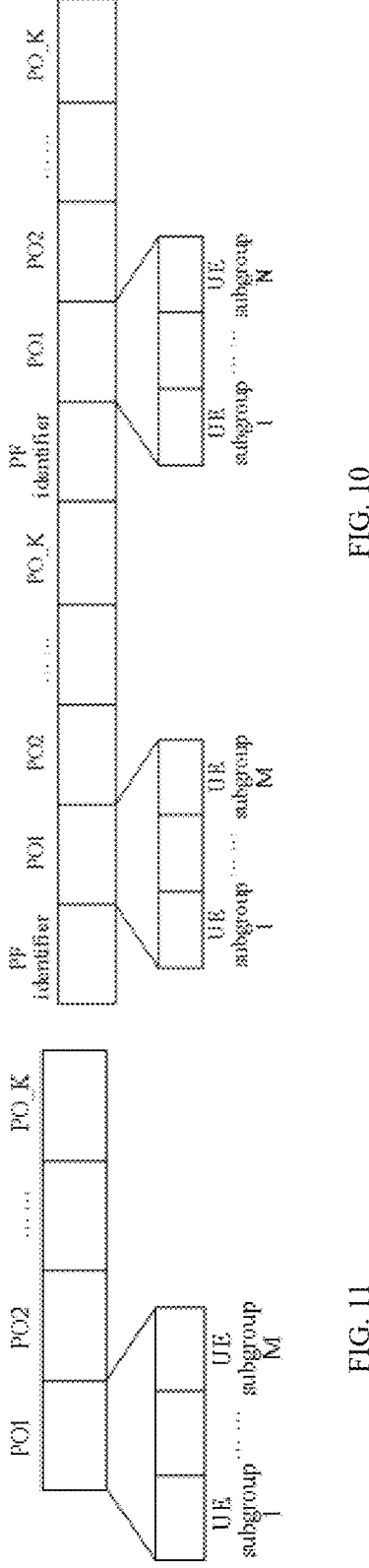
FIG. 10 is a schematic diagram of a DCI format of a paging early indication according to an embodiment of the present application.
FIG. 11 is a schematic diagram of a DCI format of a PEI according to an embodiment of the present application.

In one embodiment, the DCI may also be a combination of bit fields as shown in FIG. 9. Illustratively, FIG. 10 is a schematic diagram of a DCI format of a PEI according to an embodiment of the present application. As shown in FIG. 10, a combination of two groups of bit fields as shown in FIG. 9 may be included. For the specific content of each group of bit field, reference may be made to the description of FIG. 9, and details are not repeated here.

Illustratively, FIG. 11 is a schematic diagram of a DCI format of a PEI according to an embodiment of the present application. Different from FIG. 9, as shown in FIG. 11, DCI may not include a bit corresponding to a PF identifier. The PF identifier may be identified by a preconfigured time interval between the DCI and the PF. For the specific content of the information of K POs, reference may be made to the description of FIG. 9, and details are not repeated here.

Figures 12, 13:
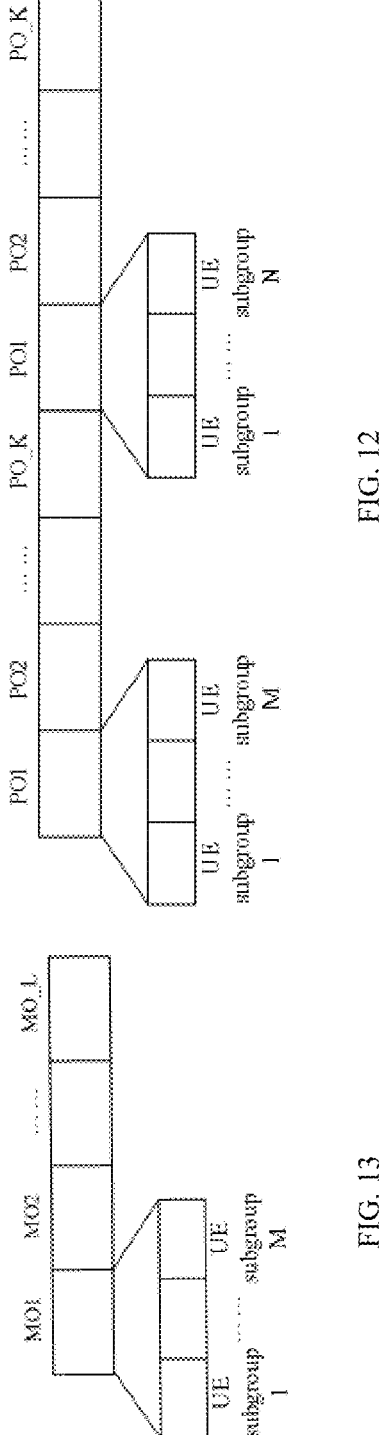
FIG. 12 is a schematic diagram of a DCI format of a PEI according to an embodiment of the present application.
FIG. 13 is a schematic diagram of a DCI format of a PEI according to an embodiment of the present application.

In one embodiment, the DCI may also be a combination of bit fields as shown in FIG. 11. Illustratively, FIG. 12 is a schematic diagram of a DCI format of a PEI according to an embodiment of the present application. As shown in FIG. 12, a combination of two groups of bit fields as shown in FIG. 11 may be included. For the specific content of each group of bit field, reference may be made to the description of FIG. 11, and details are not repeated here.

Illustratively, FIG. 13 is a schematic diagram of a DCI format of a PEI according to an embodiment of the present application. As shown in FIG. 13, bits in DCI may be used for indicating paging indication information of paging occasions starting from L monitoring occasions (MOs), where L is a natural number.

As shown in FIG. 13, the DCI may include bits, and the plurality of bits may be used for identifying information of one or more MOs. For example, MOs from MO1 to MO_L are shown in FIG. 13.

Bits identifying the information of the MOs may include one or more bits. For example, as shown in FIG. 13, the information for representing the MOs may include bits.

It should be noted that, the quantities of bits corresponding to different MOs may be the same or different. For example, since the quantities of UE subgroups corresponding to the MOs are different, the quantities of bits used for representing the UE subgroups are also different, where the quantity of bits corresponding to an MO may be the same as the quantity of the UE subgroups corresponding to the MO. For example, as shown in FIG. 13, MO1 may correspond to M UE subgroups, and adaptively, may correspond to M bits.

In the embodiment of the present application, the bits in the DCI can use "0" or "1" to indicate different contents. For example, bit 0 identifies that it is unnecessary to monitor a paging PDCCH at an MO position; bit 1 identifies that it is necessary to monitor the paging PDCCH at the MO position. Or, bit 1 identifies that it is unnecessary to monitor the paging PDCCH at the MO position; bit 0 identifies that it is necessary to monitor the paging PDCCH at the MO position. This is not specifically limited in the embodiment of the present application.

Figure 14:
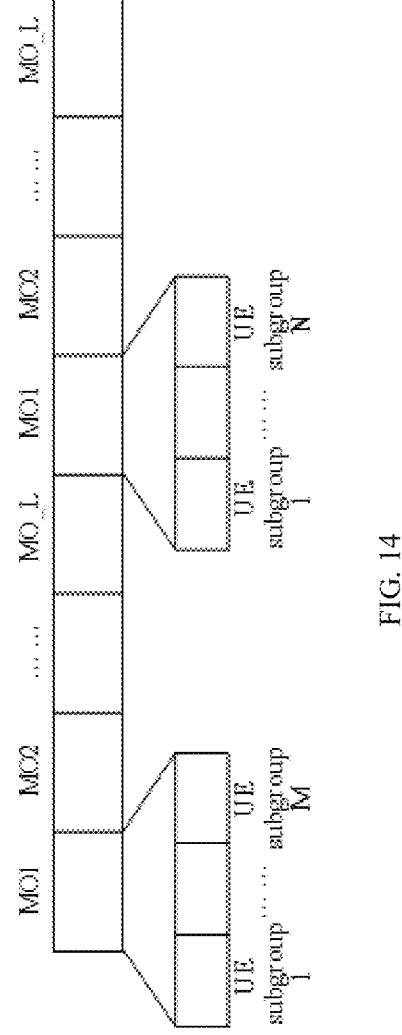
FIG. 14 is a schematic diagram of a DCI format of a PEI according to an embodiment of the present application.

In one embodiment, the DCI may also be a combination of bit fields as shown in FIG. 13. Illustratively, FIG. 14 is a schematic diagram of a DCI format of a PEI according to an embodiment of the present application. As shown in FIG. 14, a combination of two groups of bit fields as shown in FIG. 13 may be included. For the specific content of each group of bit field, reference may be made to the description of FIG. 13, and details are not repeated here.

In one embodiment, in the bit fields of the DCI shown in FIG. 13 or FIG. 14, a PF identifier as shown in FIG. 11 or FIG. 12 may also be carried, which is not described here again.

In one embodiment, the DCI may include bits indicating a PF identifier, a PO identifier and a paging indication.

Figures 15, 16, 17:
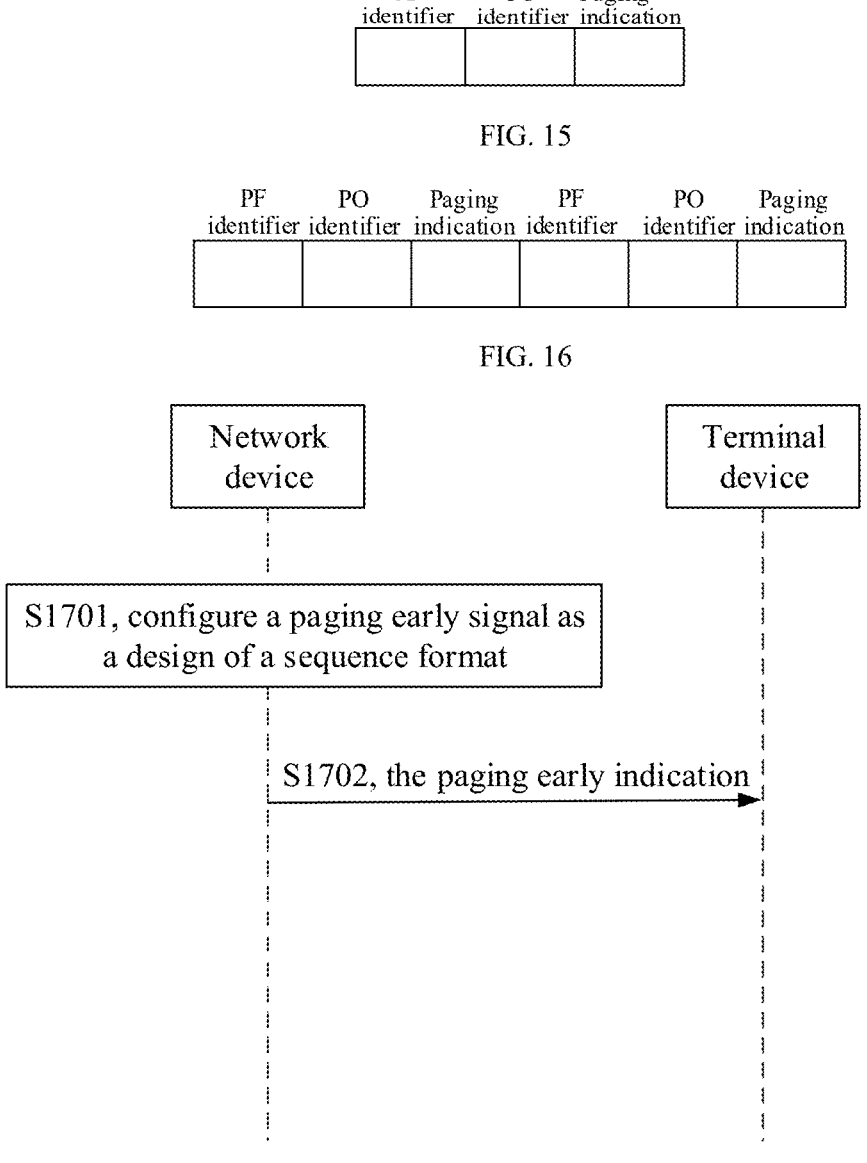
FIG. 15 is a schematic diagram of a DCI format of a PEI according to an embodiment of the present application.
FIG. 16 is a schematic diagram of a DCI format of a PEI according to an embodiment of the present application.
FIG. 17 is a schematic flowchart of a signal processing method according to an embodiment of the present application.

Illustratively, FIG. 15 is a schematic diagram of a DCI format of a PEI according to an embodiment of the present application. As shown in FIG. 15, DCI indicates a PF identifier, a PO identifier and a paging indication, where the quantities of bits corresponding to the PF identifier, the PO identifier and the paging indication may be the same or different, and details are not described here again.

In one embodiment, the DCI may also be a combination of bit fields as shown in FIG. 15. Illustratively, FIG. 16 is a schematic diagram of a DCI format of a PEI according to an embodiment of the present application. As shown in FIG. 16, a combination of two groups of bit fields as shown in FIG. 15 may be included. For the specific content of each group of bit field, reference may be made to the description of FIG. 15, and details are not repeated here. It should be noted that, based on any of the DCI formats described above, in some embodiments, a bit field of the DCI may be used for identifying at least one of the following: indication information about whether to monitor a paging PDCCH of a terminal or a terminal group under different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups. A specific identifying manner may be set according to an actual application scenario, and is not limited here. M and N may be equal or may be unequal, and M and N may be natural numbers greater than or equal to 1.

Based on any of the DCI formats described above, in some embodiments, a bit field of the DCI may also be used for identifying at least one of the following: indication information about whether to monitor a paging PDCCH of a terminal or a terminal group under different MOs of different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups. A specific identifying manner may be set according to an actual application scenario, and is not limited here. M and N may be equal or may be unequal, and M and N may be natural numbers.

S802: the network device sends the paging early indication to the terminal device.

In conclusion, after configuring the paging early indication as the design of DCI format, the network device sends the paging early indication to the terminal device, and the terminal device can perform data processing according to the paging early indication, to accurately indicate PDCCH monitoring at a paging occasion, avoiding unnecessary false wake-up or non-wake-up, and reducing power consumption of the terminal device.

In one embodiment, on the basis of the foregoing embodiments, the paging early indication may be designed as a sequence format. Illustratively, FIG. 17 is a schematic flowchart of a signal processing method according to an embodiment of the present application, which may include the following steps.

S1701: a network device configures a paging early indication as a design of sequence format.

In the embodiment of the present application, the paging early indication is a sequence, and the sequence is associated with a PF identifier, a PO identifier or an MO identifier.

Illustratively, the sequence may be generated according to a PF identifier, a PO identifier, and an identifier (identifier, ID) of an initial sequence, and then according to different sequence types (for example, a gold sequence, a hardma sequence, an M sequence, or a pseudo random sequence), to obtain a sequence length of the sequence.

Illustratively, the initial sequence meets any one of the following: the initial sequence=F(a PF frame identifier, a PO identifier); or the initial sequence=F(a PF frame identifier, an identifier of a starting slot of a PO, an identifier of a starting symbol of the PO); or, the initial sequence=F(a PF frame identifier, a starting serial number of a PO), or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO); where F denotes a function operation relationship. The function operation relationship may be a separate operation or a joint operation of addition, subtraction, multiplication or division.

S1702: the network device sends the paging early indication to the terminal device.

In conclusion, after the network device configures the paging early indication as the design of sequence format, the network device sends the paging early indication to the terminal device, and the terminal device can perform data processing according to the paging early indication, to accurately indicate PDCCH monitoring at a paging occasion, avoiding unnecessary false wake-up or non-wake-up, and reducing power consumption of the terminal device.

Figures 18, 19:
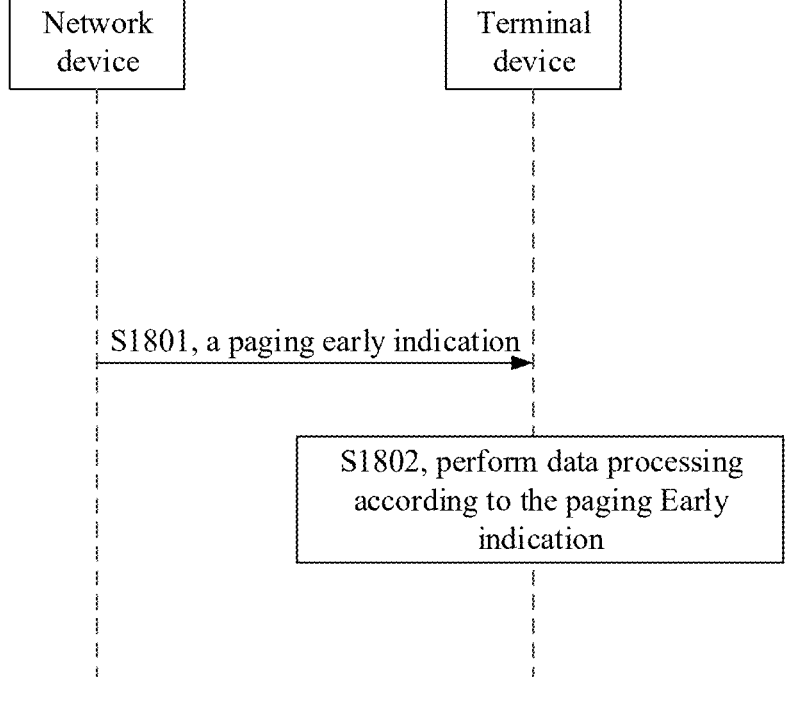
FIG. 18 is a schematic flowchart of a signal processing method according to an embodiment of the present application.
FIG. 19 is a schematic diagram of a signal processing apparatus according to an embodiment of the present application.

It should be noted that, FIG. 5 is a schematic flowchart of interaction between the network device and the terminal device. As seen from the terminal device side, illustratively, FIG. 18 is a schematic flowchart of a signal processing method according to an embodiment of the present application. As shown in FIG. 18, the method may include the following steps.

S1801: a terminal device receives a paging early indication from a network device.

In the embodiment of the present application, the terminal device is in an idle state, and the idle state is a state in which normal data transmission is not performed between the terminal device and the network device. For example, in the idle state, the terminal device only performs basic radio resource management measurement, synchronization, channel time-frequency tracking, paging message reception, a random access process or a beam management process of a radio link.

In the embodiment of the present application, the paging early indication is configured according to the network device, and for the configuration of the paging early indication by the network device, reference may be made to the adaptive description of contents of corresponding steps in the embodiments of the network device side, and the details are not described here again.

S1802: the terminal device performs data processing according to the paging early indication.

Illustratively, after receiving the paging early indication, the terminal device may determine, according to the paging early indication, whether to receive a paging signal. For example, if it is indicated that the paging signal needs to be received, the terminal device receives a paging PDCCH, and optionally a paging PDSCH, and performs corresponding demodulation and decoding. If it is indicated that no paging signal needs to be received, the terminal device does not receive the paging PDCCH and does not receive the paging PDSCH.

The paging signal may represent a signal which is sent at a paging occasion and used for paging a terminal. Parameter configuration of the paging signal includes at least one of the following: a cycle of the paging signal, for example, the cycle of the paging signal may be configured to be 32 radio frames, 64 radio frames, 128 radio frames, 256 radio frames, and other values, which are not limited; the quantity of paging frames in a paging cycle, which is configured by a signaling, and represents how many paging frames are configured within one paging cycle, where a unit of each paging frame is a radio frame, i.e. 10 ms; that a paging cycle includes at least one paging frame; the quantity of paging occasions in a paging frame, which is configured by RRC, and represents the configuration of the quantity of paging occasions in one paging frame; that a paging frame includes at least one paging occasion; a time-domain offset of a paging frame of each paging occasion; a time-domain offset of a paging occasion, etc. This is not specifically limited in the embodiment of the present application.

In conclusion, after configuring the paging early indication, the network device sends the paging early indication to the terminal device, and the terminal device can perform data processing according to the paging early indication, to accurately indicate PDCCH monitoring at a paging occasion, avoiding unnecessary false wake-up or non-wake-up, and reducing power consumption of the terminal device.

It can be seen from the above-described embodiments that, the paging early indication can indicate different POs. Further, a base station can solve the conflict problem caused by the presence of PEIs within one slot (slot) according to the manner of carrying the time-domain position of the paging occasion (for example, slot information or symbol information). After configuring the paging early indication, the network device sends the paging early indication to the terminal device, and the terminal device can perform data processing according to the paging early indication, to accurately indicate PDCCH monitoring at a paging occasion, avoiding unnecessary false wake-up or non-wake-up, and reducing power consumption of the terminal device.

At the network device side, an embodiment of the present application provides a signal processing apparatus. As shown in FIG. 19, a signal processing apparatus 190 of this embodiment may be a network device, and the signal processing apparatus 190 includes a transceiver 1901, a processor 1902 and a memory 1903.

The transceiver 1901 is configured to receive and send data under the control of the processor 1902.

In FIG. 19, a bus architecture may include any number of interconnecting buses and bridges, specifically linked together by various circuits of one or more processors represented by the processor 1902 and a memory represented by the memory 1903. The bus architecture may also link various other circuits such as peripherals, voltage regulators, power management circuits and the like, which are well known in the art, and therefore, will not be further described in the embodiment of the present application. A bus interface provides an interface. The transceiver 1901 may be elements including a transmitter and a receiver, for providing a unit for communicating with various other apparatuses over transmission media. These transmission media include transmission media such as wireless channels, wired channels, optical cables, etc. The processor 1902 is responsible for managing the bus architecture and general processing, and the memory 1903 can store data used by the processor 1902 when performing operations.

The processor 1902 may be a CPU, an ASIC, an FPGA or a CPLD, and the processor may also use a multi-core architecture.

By invoking a computer program stored in the memory 1903, the processor 1902 is configured to execute, according to the obtained executable instructions, any method related to the network device provided by the embodiments of the present application. The processor and the memory may also be physically separate.

Specifically, the processor 1902 is configured to perform the following operations:

configuring a paging early indication for a terminal device in an idle state, where the paging early indication is used for indicating monitoring of a physical downlink control channel (PDCCH) of at least one paging occasion, and/or monitoring of at least one PDCCH with different paging contents;

sending the paging early indication to the terminal device.

In one embodiment, the paging early indication indicates at least one of the following: an identifier of a paging frame within a paging cycle, an identifier of a monitoring position (MO) of a first paging PDCCH of a first paging occasion included in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, or an identifier indicating whether to monitor a PDCCH; where the paging occasion group includes at least one paging occasion.

In one embodiment, the identifier of the paging frame includes: a unique identifier of the paging frame within the paging cycle, or a serial number of the paging frame within the paging cycle, or an identifier of a time-domain position where the paging frame is located; and/or, the identifier of the monitoring occasion (MO) of the first paging PDCCH of the first paging occasion includes: a unique serial number of the monitoring occasion (MO) in the paging frame, or indication information about a time-domain position where the monitoring occasion (MO) is located; and/or, the identifier of the paging occasion group in the paging frame includes at least one of the following: a unique serial number of the paging occasion group in the paging frame, an identifier of a time-domain position of the paging occasion group, a unique serial number of a monitoring occasion (MO) of a first paging PDCCH in each paging group of the paging occasion group, an identifier of a time-domain position of a first paging occasion of the paging occasion group; and/or, the terminal identifier or the terminal group identifier of the paging occasion in the paging frame includes: a unique serial number of a terminal or a terminal group in the paging frame, or a relative serial number of a terminal or a terminal group in the paging frame; and/or, the identifier indicating the paging occasion includes: a unique serial number in the paging occasion, or an identifier of a time-domain position in the paging occasion, or an identifier of a first monitoring occasion (MO) for paging in the paging occasion; where the identifier of the first monitoring occasion (MO) for paging in the paging occasion includes a unique serial number of the monitoring occasion (MO), or an identifier of a time-domain position of the monitoring occasion (MO); and/or, the identifier indicating the paging frame and the paging occasion in the paging frame includes: a unique serial number of the paging frame within a paging cycle, or an identifier of a time-domain position of the paging frame.

In one embodiment, the paging early indication is downlink control information (DCI), and a bit field of the DCI at least identifies one of the following: indication information about whether to monitor a paging PDCCH of a terminal or a terminal group under different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the paging early indication is downlink control information (DCI), and a bit field of the DCI at least identifies one of the following: indication information about whether to monitor a paging PDCCH of a terminal or a terminal group under different MOs of different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the bit field of the DCI is further used for identifying an identifier of a paging frame (PF); or an identifier of a paging frame (PF) is preconfigured; or a PO identifier and a paging indication are indicated in the DCI; where quantities of bits corresponding to different POs are different.

In one embodiment, the DCI is a combination of bit fields of the DCI.

In one embodiment, the paging early indication is a sequence, and the sequence is associated with a PF identifier, a PO identifier, an MO identifier.

In one embodiment, an initial sequence of the sequence meets any one of the following:

the initial sequence=F(a PF frame identifier, a PO identifier); or, the initial sequence=F(a PF frame identifier, an identifier of a starting slot of a PO, an identifier of a starting symbol of the PO); or, the initial sequence=F(a PF frame identifier, a starting serial number of a PO); or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO); where F denotes a function operation relationship.

It should be noted that, the foregoing apparatus provided by the present application can implement all method steps implemented by the network device in the foregoing method embodiments, and can achieve the same effects. The parts and beneficial effects of this embodiment that are the same as those of the method embodiments are not described here again.

Figure 20:
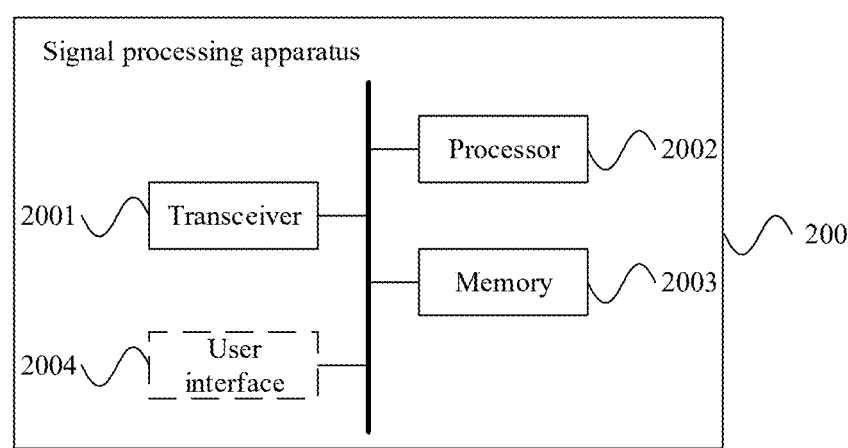
FIG. 20 is a schematic diagram of a signal processing apparatus according to an embodiment of the present application.

At the terminal device side, an embodiment of the present application provides a signal processing apparatus. As shown in FIG. 20, a signal processing apparatus 200 of this embodiment may be a terminal device, and the signal processing apparatus 200 may include a transceiver 2001, a processor 2002 and a memory 2003.

The transceiver 2001 is configured to receive and send data under the control of the processor 2002.

In FIG. 20, a bus architecture may include any number of interconnecting buses and bridges, specifically linked together by various circuits of one or more processors represented by the processor 2002 and a memory represented by the memory 2003. The bus architecture may also link various other circuits such as peripherals, voltage regulators, power management circuits and the like, which are well known in the art, and therefore, will not be further described in the embodiment of the present application. A bus interface provides an interface. The transceiver 2001 may be elements including a transmitter and a receiver, for providing a unit for communicating with various other apparatuses over transmission media. These transmission media include transmission media such as wireless channels, wired channels, optical cables, etc. In one embodiment, the signal processing apparatus 200 may further include a user interface 2004. For different user equipments, the user interface 2004 may also be an interface capable of exteriorly and internally connecting desired devices. The connected device includes, but is not limited to, a keypad, a display, a speaker, a microphone, a joystick, etc.

The processor 2002 is responsible for managing the bus architecture and general processing, and the memory 2003 can store data used by the processor 2002 when performing operations.

In one embodiment, the processor 2002 may be a central processing unit (CPU), an application specific integrated circuit (ASIC), a field-programmable gate array (FPGA), or a complex programmable logic device (CPLD), and the processor may also use a multi-core architecture.

By invoking a computer program stored in the memory 2003, the processor 2002 is configured to execute, according to the obtained executable instructions, any method related to the terminal device provided by the embodiments of the present application. The processor and the memory may also be physically separate.

Specifically, the processor 1902 is configured to perform the following operations:

receiving a paging early indication from a network device, where the terminal device is in an idle state, and the paging early indication is used for indicating monitoring of a physical downlink control channel (PDCCH) of at least one paging occasion, and/or monitoring of at least one PDCCH with different paging contents;

performing data processing according to the paging early indication.

In one embodiment, the paging early indication is used for indicating at least one of the following: an identifier of a paging frame within a paging cycle, an identifier of a monitoring occasion (MO) of a first paging PDCCH of a first paging occasion included in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, an identifier indicating whether to monitor a PDCCH; where the paging occasion group includes at least one paging occasion.

The identifier of the paging frame includes: a unique identifier of the paging frame within the paging cycle, or a serial number of the paging frame within the paging cycle, or an identifier of a time-domain position where the paging frame is located; and/or, the identifier of the monitoring occasion (MO) of the first paging PDCCH of the first paging occasion includes: a unique serial number of the monitoring occasion (MO) in the paging frame, or indication information about a time-domain position where the monitoring occasion (MO) is located; and/or, the identifier of the paging occasion group includes at least one of the following: a unique serial number of the paging occasion group in the paging frame, an identifier of a time-domain position of the paging occasion group, a unique serial number of a monitoring occasion (MO) of a first paging PDCCH in each paging group of the paging occasion group, an identifier of a time-domain position of a first paging occasion of the paging occasion group; and/or, the terminal identifier or the terminal group identifier of the paging occasion in the paging frame includes: a unique serial number of a terminal or a terminal group in the paging frame, or a relative serial number of a terminal or a terminal group in the paging frame; and/or, the identifier indicating the paging occasion includes: a unique serial number in the paging occasion, or an identifier of a time-domain position in the paging occasion, or an identifier of a first monitoring occasion (MO) for paging in the paging occasion; where the identifier of the first monitoring occasion (MO) for paging in the paging occasion includes a unique serial number of the monitoring occasion (MO), or an identifier of a time-domain position of the monitoring occasion (MO); and/or, the identifier indicating the paging frame and the paging occasion in the paging frame includes: a unique serial number of the paging frame within a paging cycle, or an identifier of a time-domain position of the paging frame.

In one embodiment, the paging early indication is downlink control information (DCI), and a bit field of the DCI at least identifies one of the following: indication information about whether to monitor a paging PDCCH of a terminal or a terminal group under different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the paging early indication is downlink control information (DCI), and a bit field of the DCI at least identifies one of the following: indication information about whether to monitor a paging PDCCH of a terminal or a terminal group under different MOs of different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the bit field of the DCI is further used for identifying an identifier of a paging frame (PF); or an identifier of a paging frame (PF) is preconfigured; or a PO identifier and a paging indication are indicated in the DCI; where quantities of bits corresponding to different POs are different.

In one embodiment, the paging early indication is a sequence, and the sequence is associated with a PF identifier, a PO identifier, an MO identifier.

In one embodiment, an initial sequence of the sequence meets any one of the following:

the initial sequence=F(a PF frame identifier, a PO identifier); or, the initial sequence=F(a PF frame identifier, an identifier of a starting slot of a PO, an identifier of a starting symbol of the PO); or, the initial sequence=F(a PF frame identifier, a starting serial number of a PO); or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO); where F denotes a function operation relationship.

It should be noted that, the foregoing apparatus provided by the present application can implement all method steps implemented by the terminal device in the foregoing method embodiments, and can achieve the same effects. The parts and beneficial effects of this embodiment that are the same as those of the method embodiments are not described here again.

Figure 21:
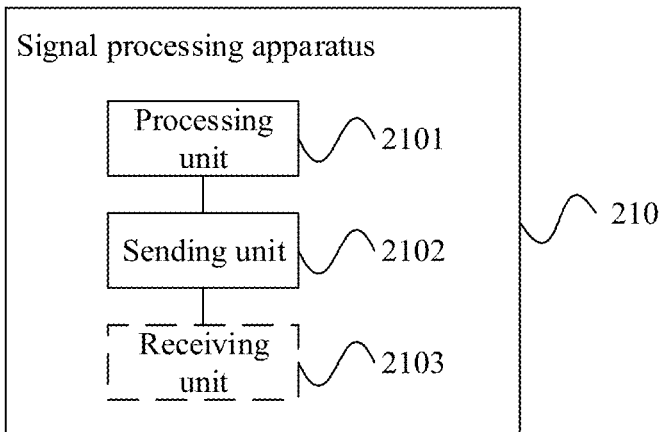
FIG. 21 is a schematic diagram of a signal processing apparatus according to an embodiment of the present application.

At the network device side, an embodiment of the present application further provides a signal processing apparatus. As shown in FIG. 21, a signal processing apparatus 210 of this embodiment may be a network device, and the signal processing apparatus 210 includes a processing device 2101 and a sending device 2102.

The processing device 2101 is configured to configure a paging early indication for a terminal device in an idle state, where the paging early indication is used for indicating monitoring of a physical downlink control channel (PDCCH) of at least one paging occasion, and/or monitoring of at least one PDCCH with different paging contents.

The sending device 2102 is configured to send the paging early indication to the terminal device.

In one embodiment, the paging early indication indicates at least one of the following: an identifier of a paging frame within a paging cycle, an identifier of a monitoring occasion (MO) of a first paging PDCCH of a first paging occasion included in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, or an identifier indicating whether to monitor a PDCCH; where the paging occasion group includes at least one paging occasion.

In one embodiment, the identifier of the paging frame includes: a unique identifier of the paging frame within the paging cycle, or a serial number of the paging frame within the paging cycle, or an identifier of a time-domain position where the paging frame is located; and/or, the identifier of the monitoring occasion (MO) of the first paging PDCCH of the first paging occasion includes: a unique serial number of the monitoring occasion (MO) in the paging frame, or indication information about a time-domain position where the monitoring occasion (MO) is located; and/or, the identifier of the paging occasion group in the paging frame includes at least one of the following: a unique serial number of the paging occasion group in the paging frame, an identifier of a time-domain position of the paging occasion group, a unique serial number of a monitoring occasion (MO) of a first paging PDCCH in each paging group of the paging occasion groups, an identifier of a time-domain position of a first paging occasion of the paging occasion group; and/or, the terminal identifier or the terminal group identifier of the paging occasion in the paging frame includes: a unique serial number of a terminal or a terminal group in the paging frame, or a relative serial number of a terminal or a terminal group in the paging frame; and/or, the identifier indicating the paging occasion includes: a unique serial number in the paging occasion, or an identifier of a time-domain position in the paging occasion, or an identifier of a first monitoring occasion (MO) for paging in the paging occasion; where the identifier of the first monitoring occasion (MO) for paging in the paging occasion includes a unique serial number of the monitoring occasion (MO), or an identifier of a time-domain position of the monitoring occasion (MO); and/or, the identifier indicating the paging frame and the paging occasion in the paging frame includes: a unique serial number of the paging frame within a paging cycle, or an identifier of a time-domain position of the paging frame.

In one embodiment, the paging early indication is downlink control information (DCI), and a bit field of the DCI at least identifies one of the following: indication information about whether to monitor a paging PDCCH of a terminal or a terminal group under different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the paging early indication is downlink control information (DCI), and a bit field of the DCI at least identifies one of the following: indication information about whether to monitor a paging PDCCH of a terminal or a terminal group under different MOs of different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the bit field of the DCI is further used for identifying an identifier of a paging frame (PF); or an identifier of a paging frame (PF) is preconfigured; or a PO identifier and a paging indication are indicated in the DCI; where quantities of bits corresponding to different POs are different.

In one embodiment, the paging early indication is a sequence, and the sequence is associated with a PF identifier, a PO identifier, an MO identifier.

In one embodiment, an initial sequence of the sequence meets any one of the following:
the initial sequence=F(a PF frame identifier, a PO identifier); or,
the initial sequence=F(a PF frame identifier, an identifier of a starting slot of a PO, an identifier of a starting symbol of the PO); or,
the initial sequence=F(a PF frame identifier, a starting serial number of a PO); or,
the initial sequence=F(a PF frame identifier, an identifier of a starting MO in a PO); or,
the initial sequence=F(a PF frame identifier, a slot identifier of a starting MO, a symbol identifier of the starting MO); or,
the initial sequence=F(a PF frame identifier, a serial number of a starting MO); or,
the initial sequence=F(an identifier of a starting MO in a PO); or,
the initial sequence=F(a slot identifier of a starting MO, a symbol identifier of the starting MO); or,
the initial sequence=F(a serial number of a starting MO);
where F denotes a function operation relationship.

It should be noted that, the foregoing apparatus provided by the present application can implement all method steps implemented by the network device in the foregoing method embodiments, and can achieve the same effects. The parts and beneficial effects of this embodiment that are the same as those of the method embodiments are not described here again.

Figure 22:
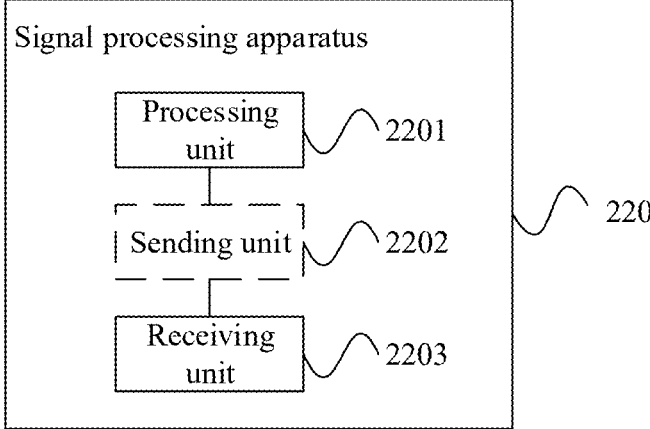
FIG. 22 is a schematic diagram of a signal processing apparatus according to an embodiment of the present application.

At the terminal device side, an embodiment of the present application further provides a signal processing apparatus. As shown in FIG. 22, a signal processing apparatus 220 of this embodiment of the present application may be a terminal device, and the signal processing apparatus 220 includes a receiving device 2203 and a processing device 2201.

The receiving device 2203 is configured to receive a paging early indication from a network device, where the terminal device is in an idle state, and the paging early indication is used for indicating monitoring of a physical downlink control channel (PDCCH) of at least one paging occasion, and/or monitoring of at least one PDCCH with different paging contents.

The processing device 2201 is configured to perform data processing according to the paging early indication.

In one embodiment, the paging early indication is used for indicating at least one of the following: an identifier of a paging frame within a paging cycle, an identifier of a monitoring occasion (MO) of a first paging PDCCH of a first paging occasion included in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, or an identifier indicating whether to monitor a PDCCH; where the paging occasion group includes at least one paging occasion.

In one embodiment, the identifier of the paging frame includes: a unique identifier of the paging frame within the paging cycle, or a serial number of the paging frame within the paging cycle, or an identifier of a time-domain position where the paging frame is located; and/or,
the identifier of the monitoring occasion (MO) of the first paging PDCCH of the first paging occasion includes: a unique serial number of the monitoring occasion (MO) in the paging frame, or indication information about a time-domain position where the monitoring occasion (MO) is located; and/or,
the identifier of the paging occasion group includes at least one of the following: a unique serial number of the paging occasion group in the paging frame, an identifier of a time-domain position of the paging occasion group, a unique serial number of a monitoring occasion (MO) of a first paging PDCCH in each paging group of the paging occasion group, an identifier of a time-domain position of a first paging occasion of the paging occasion group; and/or,
the terminal identifier or the terminal group identifier of the paging occasion in the paging frame includes: a unique serial number of a terminal or a terminal group in the paging frame, or a relative serial number of a terminal or a terminal group in the paging frame; and/or, the identifier indicating the paging occasion includes: a unique serial number in the paging occasion, or an identifier of a time-domain position in the paging occasion, or an identifier of a first monitoring occasion (MO) for paging in the paging occasion; where the identifier of the first monitoring occasion (MO) for paging in the paging occasion includes a unique serial number of the monitoring occasion (MO), or an identifier of a time-domain position of the monitoring occasion (MO); and/or,
the identifier indicating the paging frame and the paging occasion in the paging frame includes: a unique serial number of the paging frame within a paging cycle, or an identifier of a time-domain position of the paging frame.

In one embodiment, the paging early indication is downlink control information (DCI), and a bit field of the DCI at least identifies one of the following: indication information about whether to monitor a paging PDCCH of a terminal or a terminal group under different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the paging early indication is downlink control information (DCI), and a bit field of the DCI at least identifies one of the following: indication information about whether to monitor a paging PDCCH of a terminal or a terminal group under different MOs of different paging occasions (POs) corresponding to at least one PF identifier, indication information about whether to monitor paging PDCCHs corresponding to M terminals or M terminal groups, indication information about whether to monitor paging PDCCHs corresponding to N terminals or N terminal groups; where M and N are natural numbers greater than or equal to 1.

In one embodiment, the bit field of the DCI is further used for identifying an identifier of a paging frame (PF); or an identifier of a paging frame (PF) is preconfigured; or a PO identifier and a paging indication are indicated in the DCI; where quantities of bits corresponding to different POs are different.

In one embodiment, the paging early indication is a sequence, and the sequence is associated with a PF identifier, a PO identifier, an MO identifier.

In one embodiment, an initial sequence of the sequence meets any one of the following:

the initial sequence=F(a PF frame identifier, a PO identifier); or, the initial sequence=F(a PF frame identifier, an identifier of a starting slot of a PO, an identifier of a starting symbol of the PO); or, the initial sequence=F(a PF frame identifier, a starting serial number of a PO); or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO);

where F denotes a function operation relationship.

It should be noted that, the foregoing apparatus provided by the present application can implement all method steps implemented by the terminal device in the foregoing method embodiments, and can achieve the same effects. The parts and beneficial effects of this embodiment that are the same as those of the method embodiments are not described here again.

It should be noted that division of the units in the embodiments of the present application is schematic, which is merely logical function division and may be other division in actual implementations. In addition, various functional units in the embodiments of the present application may be integrated into one processing unit, or each of the units may exist separately, or two or more units are integrated into one unit. The integrated unit may be implemented in a form of hardware, and may also be implemented in a form of a software functional unit.

If the integrated unit is implemented in the form of the software functional unit and sold or used as an independent product, the integrated unit may be stored in a processor-readable storage medium. Based on such understanding, embodiments of the present application essentially, or the part contributing to the prior art, or all or a part of the embodiments may be implemented in a form of a software product. The computer software product is stored in a storage medium and includes several instructions for causing a computer device (which may be a personal computer, a server, or a network device, etc.) or a processor to execute all or part of the steps of the methods described in the embodiments of the present application. The foregoing storage medium includes: any medium that can store program codes, such as a USB flash disk, a mobile hard disk, a read-only memory (ROM), a random access memory (RAM), a magnetic disk, or an optical disk, etc.

At the network device side, an embodiment of the present application provides a processor-readable storage medium. The processor-readable storage medium stores a computer program, and the computer program is used for causing a processor to execute any method related to the network device provided by the embodiments of the present application. In this way, the processor can implement all method steps implemented by the network device in the foregoing method embodiments, and can achieve the same effects. The parts and beneficial effects of this embodiment that are the same as those of the method embodiments are not described here again.

At the terminal device side, an embodiment of the present application provides a processor-readable storage medium. The processor-readable storage medium stores a computer program, and the computer program is used for causing a processor to execute any method related to the terminal device provided by the embodiments of the present application. In this way, the processor can implement all method steps implemented by the terminal device in the foregoing method embodiments, and can achieve the same effects. The parts and beneficial effects of this embodiment that are the same as those of the method embodiments are not described here again.

The processor-readable storage medium may be any available medium or data storage device that can be accessed by the processor, including but not limited to a magnetic memory (such as a floppy disk, a hard disk, a magnetic tape, a magneto-optical disk (MO), etc.), an optical memory (such as a CD, a DVD, a BD, an HVD, etc.), and a semiconductor memory (such as a ROM, an EPROM, an EEPROM, a non-volatile memory (NAND FLASH), a solid state disk (SSD)), etc.

The embodiments of the present application can be provided as a method, a system or a computer program product. Therefore, the present application may adopt the form of an entirely hardware embodiment, an entirely software embodiment or an embodiment combining software and hardware. Furthermore, the present application may adopt the form of a computer program product implemented on one or more computer-usable storage media (including but not limited to a disk memory, an optical memory, and the like) containing computer-usable program codes.

The present application is described with reference to the flowcharts and/or block diagrams of the methods, apparatuses and computer program products according to the embodiments of the present application. It should be understood that, each flow and/or block in the flowcharts and/or block diagrams and combinations of flows and/or blocks in the flowcharts and/or block diagrams can be implemented by computer-executable instructions. The computer-executable instructions may be provided to a processor of a general-purpose computer, a special-purpose computer, an embedded processor or other programmable data processing devices to produce a machine, which enables instructions executed by a processor of a computer or other programmable data processing devices to generate an apparatus for implementing functions specified in one or more processes in the flowcharts and/or one or more blocks in the block diagrams.

These processor-executable instructions may also be stored in a processor-readable memory that can direct a computer or other programmable data processing devices to operate in a particular manner, and the instructions stored in the processor-readable memory generate an article of manufacture including an instruction apparatus. The instruction apparatus implements functions specified in one or more processes in the flowcharts and/or one or more blocks in the block diagrams.

These processor-executable instructions may also be loaded into a computer or other programmable data processing devices, and a series of operational steps are performed on the computer or other programmable devices to generate computer-implemented processing. Thus, the instructions executed on the computer or other programmable devices provide steps for implementing the functions specified in one or more processes in the flowcharts and/or one or more blocks in the block diagrams.

The invention claimed is:

1. A signal processing method, comprising:

configuring, by a network device, a paging early indication for a terminal device in an idle state, wherein the paging early indication is used for indicating at least one of the following: monitoring of a physical downlink control channel (PDCCH) of at least one paging occasion, monitoring of at least one PDCCH with different paging contents;

sending, by the network device, the paging early indication to the terminal device;

wherein the paging early indication is downlink control information (DCI), and a bit field of the DCI at least identifies one of the following: indication information about whether to monitor a paging PDCCH of a terminal or a terminal group under different paging occasions (POs) corresponding to at least one paging frame (PF) identifier, indication information about whether to monitor paging PDCCHs corresponding to M terminals or M terminal groups, indication information about whether to monitor paging PDCCHs corresponding to N terminals or N terminal groups; wherein M and N are natural numbers greater than or equal to 1, or the paging early indication is DCI, and a bit field of the DCI at least identifies one of the following: indication information about whether to monitor a paging PDCCH of a terminal or a terminal group under different monitoring occasions (MOs) of different POs corresponding to at least one PF identifier, indication information about whether to monitor paging PDCCHs corresponding to M terminals or M terminal groups, indication information about whether to monitor paging PDCCHs corresponding to N terminals or N terminal groups; wherein M and N are natural numbers greater than or equal to 1.

2. The method according to claim 1, wherein the paging early indication is used for indicating at least one of the following: an identifier of a paging frame within a paging cycle, an identifier of an MO of a first paging PDCCH of a first paging occasion comprised in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, or an identifier indicating whether to monitor a PDCCH; wherein the paging occasion group comprises at least one paging occasion.

3. The method according to claim 2, wherein the identifier of the paging frame comprises: a unique identifier of the paging frame within the paging cycle, or a serial number of the paging frame within the paging cycle, or an identifier of a time-domain position where the paging frame is located; and/or, the identifier of the MO of the first paging PDCCH of the first paging occasion comprises: a unique serial number of the MO in the paging frame, or indication information about a time-domain position where the MO is located; and/or, the identifier of the paging occasion group in the paging frame comprises at least one of the following: a unique serial number of the paging occasion group in the paging frame, an identifier of a time-domain position of the paging occasion group, a unique serial number of an MO of a first paging PDCCH in each paging group of the paging occasion group, or an identifier of a time-domain position of a first paging occasion of the paging occasion group; and/or, the terminal identifier or the terminal group identifier of the paging occasion in the paging frame comprises: a unique serial number of a terminal or a terminal group in the paging frame, or a relative serial number of a terminal or a terminal group in the paging frame; and/or, the identifier indicating the paging occasion comprises: a unique serial number in the paging occasion, or an identifier of a time-domain position in the paging occasion, or an identifier of a first MO for paging in the paging occasion; wherein the identifier of the first MO for paging in the paging occasion comprises a unique serial number of the MO, or an identifier of a time-domain position of the MO; and/or, the identifier indicating the paging frame and the paging occasion in the paging frame comprises: a unique serial number of the paging frame within a paging cycle, or an identifier of a time-domain position of the paging frame.

4. The method according to claim 1, wherein the bit field of the DCI is further used for identifying an identifier of a PF; or an identifier of a PF is preconfigured; or a PO identifier and a paging indication are indicated in the DCI; wherein quantities of bits corresponding to different POs are different.

5. The method according to claim 1, wherein the paging early indication is a sequence, and the sequence is associated with a PF identifier, a PO identifier, an MO identifier.

6. The method according to claim 5, wherein an initial sequence of the sequence meets any one of the following:

the initial sequence=F(a PF frame identifier, a PO identifier); or, the initial sequence=F(a PF frame identifier, an identifier of a starting slot of a PO, an identifier of a starting symbol of the PO); or, the initial sequence=F(a PF frame identifier, a starting serial number of a PO); or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO);

wherein F denotes a function operation relationship.

7. A signal processing apparatus, comprising a memory, a transceiver and a processor;

the memory is configured to store a computer program;

the transceiver is configured to receive and send data under control of the processor;

the processor is configured to read the computer program in the memory and perform the method according to claim 1.

8. A signal processing method, comprising:

receiving, by a terminal device, a paging early indication from a network device, wherein the terminal device is in an idle state, and the paging early indication is used for indicating at least one of the following: monitoring of a physical downlink control channel (PDCCH) of at least one paging occasion, monitoring of at least one PDCCH with different paging contents;

performing, by the terminal device, data processing according to the paging early indication;

wherein the paging early indication is downlink control information (DCI), and a bit field of the DCI at least identifies one of the following: indication information about whether to monitor a paging PDCCH of a terminal or a terminal group under different paging occasions (POs) corresponding to at least one paging frame (PF) identifier, indication information about whether to monitor paging PDCCHs corresponding to M terminals or M terminal groups, indication information about whether to monitor paging PDCCHs corresponding to N terminals or N terminal groups; wherein M and N are natural numbers greater than or equal to 1, or the paging early indication is DCI, and a bit field of the DCI at least identifies one of the following: indication information about whether to monitor a paging PDCCH of a terminal or a terminal group under different monitoring occasions (MOs) of different POs corresponding to at least one PF identifier, indication information about whether to monitor paging PDCCHs corresponding to M terminals or M terminal groups, indication information about whether to monitor paging PDCCHs corresponding to N terminals or N terminal groups; wherein M and N are natural numbers greater than or equal to 1.

9. The method according to claim 8, wherein the paging early indication is used for indicating at least one of the following: an identifier of a paging frame within a paging cycle, an identifier of an MO of a first paging PDCCH of a first paging occasion comprised in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, or an identifier indicating whether to monitor a PDCCH; wherein the paging occasion group comprises at least one paging occasion.

10. The method according to claim 9, wherein the identifier of the paging frame comprises: a unique identifier of the paging frame within the paging cycle, or a serial number of the paging frame within the paging cycle, or an identifier of a time-domain position where the paging frame is located; and/or, the identifier of the MO of the first paging PDCCH of the first paging occasion comprises: a unique serial number of the MO in the paging frame, or indication information about a time-domain position where the MO is located; and/or, the identifier of the paging occasion group comprises at least one of the following: a unique serial number of the paging occasion group in the paging frame, an identifier of a time-domain position of the paging occasion group, a unique serial number of an MO of a first paging PDCCH in each paging group of the paging occasion group, an identifier of a time-domain position of a first paging occasion of the paging occasion group; and/or, the terminal identifier or the terminal group identifier of the paging occasion in the paging frame comprises: a unique serial number of a terminal or a terminal group in the paging frame, or a relative serial number of a terminal or a terminal group in the paging frame; and/or, the identifier indicating the paging occasion comprises: a unique serial number in the paging occasion, or an identifier of a time-domain position in the paging occasion, or an identifier of a first MO for paging in the paging occasion; wherein the identifier of the first MO for paging in the paging occasion comprises a unique serial number of the MO, or an identifier of a time-domain position of the MO; and/or, the identifier indicating the paging frame and the paging occasion in the paging frame comprises: a unique serial number of the paging frame within a paging cycle, or an identifier of a time-domain position of the paging frame.

11. The method according to claim 9, wherein the bit field of the DCI is further used for identifying an identifier of a PF; or an identifier of a PF is preconfigured; or a PO identifier and a paging indication are indicated in the DCI, wherein quantities of bits corresponding to different POs are different.

12. The method according to claim 8, wherein the paging early indication is a sequence, and the sequence is associated with a PF identifier, a PO identifier, an MO identifier.

13. The method according to claim 12, wherein an initial sequence of the sequence meets any one of the following:

the initial sequence=F(a PF frame identifier, a PO identifier); or, the initial sequence=F(a PF frame identifier, an identifier of a starting slot of a PO, an identifier of a starting symbol of the PO); or, the initial sequence=F(a PF frame identifier, a starting serial number of a PO); or, the initial sequence=F(a PF frame identifier, an identifier of a starting MO in a PO); or, the initial sequence=F(a PF frame identifier, a slot identifier of a starting MO, a symbol identifier of the starting MO); or, the initial sequence=F(a PF frame identifier, a serial number of a starting MO); or, the initial sequence=F(an identifier of a starting MO in a PO); or, the initial sequence=F(a slot identifier of a starting MO, a symbol identifier of the starting MO); or, the initial sequence=F(a serial number of a starting MO);

wherein F denotes a function operation relationship.

14. A signal processing apparatus, comprising a memory, a transceiver and a processor;

the memory is configured to store a computer program;

the transceiver is configured to receive and send data under control of the processor;

the processor is configured to read the computer program in the memory and perform the following operations:

receiving a paging early indication from a network device, wherein a terminal device is in an idle state, and the paging early indication is used for indicating monitoring of a physical downlink control channel PDCCH of at least one paging occasion, and/or monitoring of at least one PDCCH with different paging contents;

performing data processing according to the paging early indication;

wherein the paging early indication is downlink control information (DCI), and a bit field of the DCI at least identifies one of the following: indication information about whether to monitor a paging PDCCH of a terminal or a terminal group under different paging occasions (POs) corresponding to at least one paging frame (PF) identifier, indication information about whether to monitor paging PDCCHs corresponding to M terminals or M terminal groups, indication information about whether to monitor paging PDCCHs corresponding to N terminals or N terminal groups; wherein M and N are natural numbers greater than or equal to 1, or the paging early indication is DCI, and a bit field of the DCI at least identifies one of the following: indication information about whether to monitor a paging PDCCH of a terminal or a terminal group under different monitoring occasions (MOs) of different POs corresponding to at least one PF identifier, indication information about whether to monitor paging PDCCHs corresponding to M terminals or M terminal groups, indication information about whether to monitor paging PDCCHs corresponding to N terminals or N terminal groups; wherein M and N are natural numbers greater than or equal to 1.

15. The apparatus according to claim 14, wherein the paging early indication is used for indicating at least one of the following: an identifier of a paging frame within a paging cycle, an identifier of an MO of a first paging PDCCH of a first paging occasion comprised in a paging frame, an identifier of a paging occasion group in a paging frame, a terminal identifier or a terminal group identifier of a paging occasion in a paging frame, an identifier indicating a paging occasion, a sequential number indicating a paging occasion within a paging cycle, an identifier indicating a paging frame and a paging occasion in the paging frame, an identifier indicating whether to monitor a PDCCH; wherein the paging occasion group comprises at least one paging occasion.

16. The apparatus according to claim 15, wherein the identifier of the paging frame comprises: a unique identifier of the paging frame within the paging cycle, or a serial number of the paging frame within the paging cycle, or an identifier of a time-domain position where the paging frame is located; and/or, the identifier of the MO of the first paging PDCCH of the first paging occasion comprises: a unique serial number of the MO in the paging frame, or indication information about a time-domain position where the MO is located; and/or, the identifier of the paging occasion group comprises at least one of the following: a unique serial number of the paging occasion group in the paging frame, an identifier of a time-domain position of the paging occasion group, a unique serial number of an MO of a first paging PDCCH in each paging group of the paging occasion group, an identifier of a time-domain position of a first paging occasion of the paging occasion group; and/or, the terminal identifier or the terminal group identifier of the paging occasion in the paging frame comprises: a unique serial number of a terminal or a terminal group in the paging frame, or a relative serial number of a terminal or a terminal group in the paging frame; and/or, the identifier indicating the paging occasion comprises: a unique serial number in the paging occasion, or an identifier of a time-domain position in the paging occasion, or an identifier of a first MO for paging in the paging occasion; wherein the identifier of the first MO for paging in the paging occasion comprises a unique serial number of the MO, or an identifier of a time-domain position of the MO; and/or, the identifier indicating the paging frame and the paging occasion in the paging frame comprises: a unique serial number of the paging frame within a paging cycle, or an identifier of a time-domain position of the paging frame.

* * * * *